(12) United States Patent
Worters et al.

(10) Patent No.: US 11,924,821 B1
(45) Date of Patent: Mar. 5, 2024

(54) TIMING HALF-DUPLEX TRANSMISSIONS

(71) Applicant: Space Exploration Technologies Corp., Hawthorne, CA (US)

(72) Inventors: Peter J. Worters, San Carlos, CA (US); Martin S. McCormick, Studio City, CA (US); Andrew G. Whitlow, Carnation, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/339,860

(22) Filed: Jun. 4, 2021

Related U.S. Application Data

(60) Provisional application No. 63/035,123, filed on Jun. 5, 2020.

(51) Int. Cl.
| | |
|---|---|
| *H04W 72/121* | (2023.01) |
| *H04B 7/185* | (2006.01) |
| *H04L 5/16* | (2006.01) |
| *H04W 56/00* | (2009.01) |
| *H04W 72/1273* | (2023.01) |

(52) U.S. Cl.
CPC ...... *H04W 72/121* (2013.01); *H04B 7/18513* (2013.01); *H04L 5/16* (2013.01); *H04W 56/0045* (2013.01); *H04W 56/0055* (2013.01); *H04W 72/1273* (2013.01)

(58) Field of Classification Search
CPC ........... H04W 72/121; H04W 72/1273; H04W 56/0055; H04W 56/0045; H04B 7/18513; H04L 5/16
See application file for complete search history.

(56) References Cited

U.S. PATENT DOCUMENTS

| | | | |
|---|---|---|---|
| 10,177,837 B2 * | 1/2019 | Ravishankar | ...... H04B 7/18513 |
| 2017/0005741 A1 * | 1/2017 | Wu | ........................ H04W 24/08 |
| 2021/0204254 A1 * | 7/2021 | Lou | ........................ H04L 5/0023 |

* cited by examiner

*Primary Examiner* — Jianye Wu
(74) *Attorney, Agent, or Firm* — Polsinelli PC

(57) ABSTRACT

Systems, methods, and non-transitory media are provided for timing half-duplex transmissions in a wireless communication system. An example method can include receiving, by a user terminal (UT), a radio frame transmitted by a satellite to a group of UTs; identifying an offset delay defined in the radio frame for scheduling transmissions between the satellite and each UT in the group of UTs, the offset delay providing non-overlapping time intervals for receive, process, and transmit operations at each UT; determining, based on the offset delay and a time when the radio frame was received by the UT, a time for transmitting an uplink radio burst to the satellite, wherein the uplink radio burst transmitted at the time is estimated to arrive at the satellite within a same radio frame interval as uplink radio bursts from other UTs; and transmitting, to the satellite, the uplink radio burst at the time.

20 Claims, 13 Drawing Sheets

TIMING HALF-DUPLEX TRANSMISSIONS

CROSS-REFERENCE TO RELATED APPLICATIONS

This application claims priority to U.S. Provisional Patent Application No. 63/035,123, filed on Jun. 5, 2020, entitled "TIMING HALF-DUPLEX TRANSMISSIONS", the contents of which are hereby incorporated by reference in their entirety and for all purposes.

TECHNICAL FIELD

The present disclosure generally relates to wireless communications systems and, more specifically, timing transmissions between a wireless communications system and half-duplex devices.

BACKGROUND

Wireless communication systems, such as cellular and satellite communication systems, can use orthogonal frequency-division multiple access (OFDMA) to modulate uplink transmissions from multiple devices, such as user terminals. With OFDMA, radio signals can be split into sub-signals and transmitted simultaneously or in parallel to a receiver. For example, devices can be assigned non-overlapping sets of contiguous time and frequency subcarriers (e.g., resource elements) that such devices can use to transmit wireless signals simultaneously. Since the signals are orthogonal, a wireless receiver can separate the signals from the different devices, allowing the receiver to receive and process multiple signals within a single radio frame. Thus, with OFDMA, a wireless communication system can receive transmissions from multiple devices within a single radio frame and thereby achieve high spectral efficiency.

To avoid interference from overlapping signals, transmissions in an OFDMA scheme can be allocated to non-overlapping time and frequency subcarriers. However, OFDMA schemes are sensitive to Doppler shift and time synchronization problems. For example, OFDMA schemes can be prone to frequency synchronization problems caused by motion (e.g., Doppler effects) and time synchronization problems caused by various delays and timing errors. In some cases, the relative motion and distance between a wireless receiver and the transmitting devices can vary widely, which can cause different propagation delays and increasingly difficult time and frequency synchronization issues. Satellite-based communications can be particularly vulnerable to such synchronization problems as uplink transmissions from devices must generally travel vast distances to satellite receivers moving at high velocities. Such timing issues can be further exacerbated when communicating with half-duplex devices that are not able to send and receive at the same time and thus are more susceptible to timing-related problems.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1A:
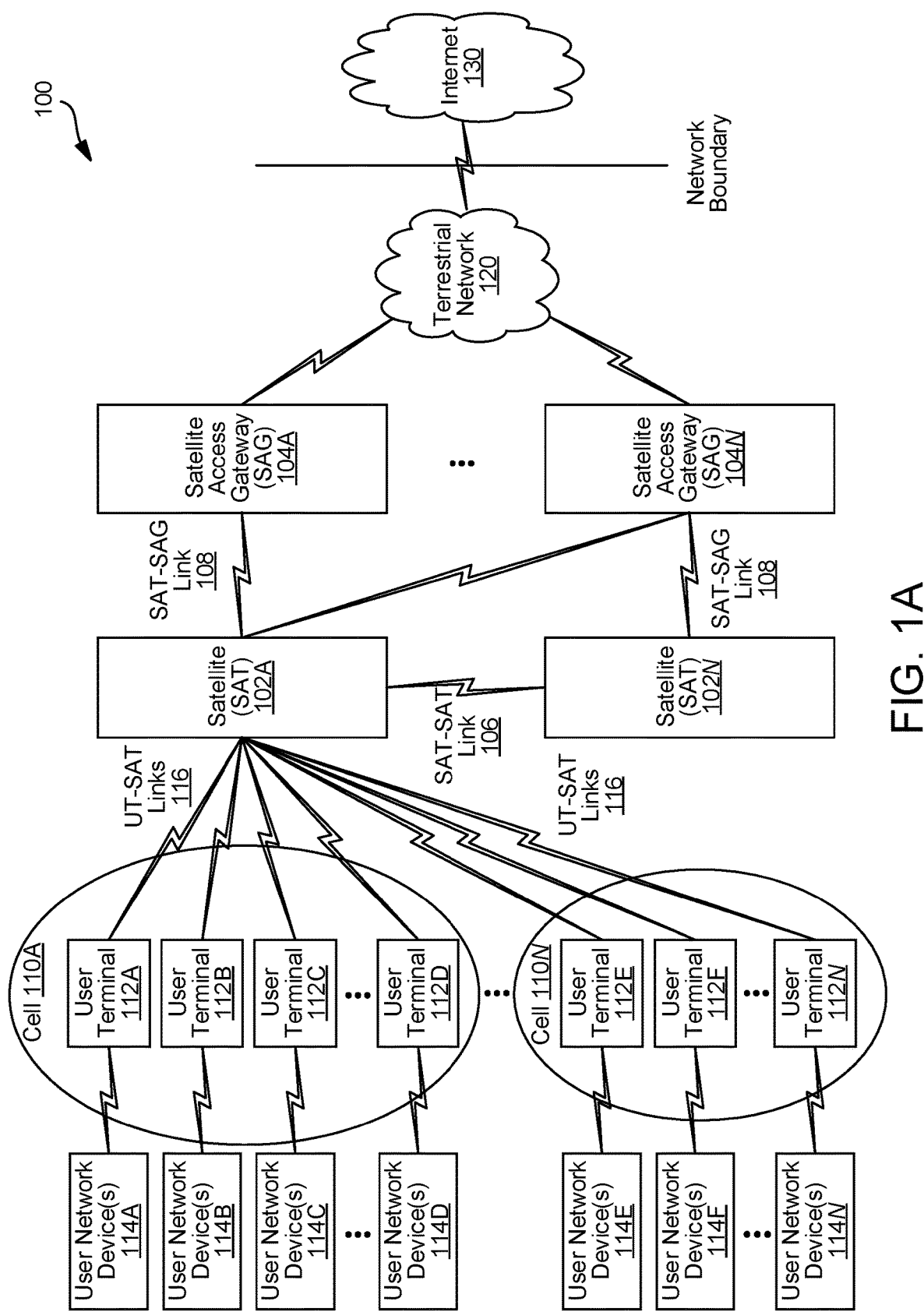
FIG. 1A is a simplified diagram illustrating an example wireless communication system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously explained, wireless communication systems can use OFDMA to split a radio signal into multiple sub-signals or sub-carriers to allow the wireless communication system to receive signals from different devices within a single radio frame. For example, devices can be assigned non-overlapping sets of contiguous time and frequency subcarriers that such devices can use to transmit signals simultaneously without interference. However, since the signals are orthogonal, OFDMA schemes are sensitive to Doppler shift and time synchronization problems. Such frequency and time synchronization problems can cause interference from overlapping signals. Moreover, the timing issues can be further exacerbated when communicating with half-duplex devices which are not able to send and receive at the same time and thus are more susceptible to timing-related problems.

As further described herein, to avoid having transmit and receive signals overlap in time at the half-duplex devices and/or prevent misalignment of transmissions received from multiple half-duplex devices, communications between a receiver and the half-duplex devices can be timed so that uplink transmissions from a half-duplex device never overlap in time with downlink transmissions received by that same half-duplex device. For example, downlink transmissions to half-duplex devices can be timed so they are not received by the half-duplex devices before they have switched (or are ready to switch) to receive mode (e.g., while they are transmitting and/or processing a signal). Similarly, uplink transmissions from the half-duplex devices can be timed so the half-duplex devices do not receive a downlink transmission before they have switched (or are ready to switch) to receive mode.

In some cases, the half-duplex devices can all transmit at the same time and all downlink transmission to the half-duplex devices can be timed so they are not received by the half-duplex devices before they have finished transmitting. This approach can reduce the timing and synchronization complexity for half-duplex communications since all half-duplex devices can simply use a same time or time window to process and send their uplink transmissions and a different time or time window to receive downlink transmissions. However, such approaches would result in inefficient use of bandwidth, as all half-duplex devices would share the same bandwidth when transmitting and receiving, and the transmit and receive latencies for all half-duplex devices would increase to accommodate the half-duplex devices with the highest propagation and/or processing delays (e.g., with the highest latencies). In some aspects, the approaches disclosed herein can partition half-duplex devices into groups that transmit and receive transmissions at different time intervals to provide more efficient sharing of bandwidth between devices and reduce overall latencies for the half-duplex devices. The different time intervals can be carefully timed to avoid transmit and receive signals overlapping in time at any half-duplex device.

Disclosed herein are systems, methods, and computer-readable media for timing half-duplex transmissions. The disclosed technologies can accurately time uplink and downlink transmissions (e.g., uplink and downlink radio frames) to prevent overlapping (in time) transmissions or operations at any half-duplex device. In some aspects, the disclosed technologies can partition half-duplex devices into different groups that send and receive transmissions at different times to provide more efficient use of bandwidth between the groups of half-duplex devices and reduce the overall latency of half-duplex transmissions. The transmit and receive times for each group of half-duplex devices can be intelligently calculated to prevent overlapping uplink and downlink transmissions at any half-duplex device. For example, half-duplex transmissions can be timed so a first group of devices transmits while a second group of devices processes data and a third group of devices receives data. The half-duplex transmissions can be timed so when the groups of devices finish their respective operations (e.g., transmit, process, receive) they can switch operations (e.g., switch between transmit, process, and receive) and continue to switch operations accordingly so the groups of devices transmit, process and receive data at different times.

As referenced herein, a radio frame can represent and/or include a time window for one or more downlink transmissions from a satellite to user terminals, or a time window for one or more uplink transmissions from the user terminals to the satellite. Moreover, as referenced herein, a radio frame can also represent and/or include one or more signals and/or data (e.g., radio bursts, packets, etc.) transmitted within the time window for the one or more uplink transmissions or the one or more downlink transmissions. For example, a radio frame can include data transmitted by a satellite to user terminals within a time window associated with the radio frame, or one or more radio bursts received by the satellite from the user terminals within the time window associated with the radio frame.

Figure 8A:
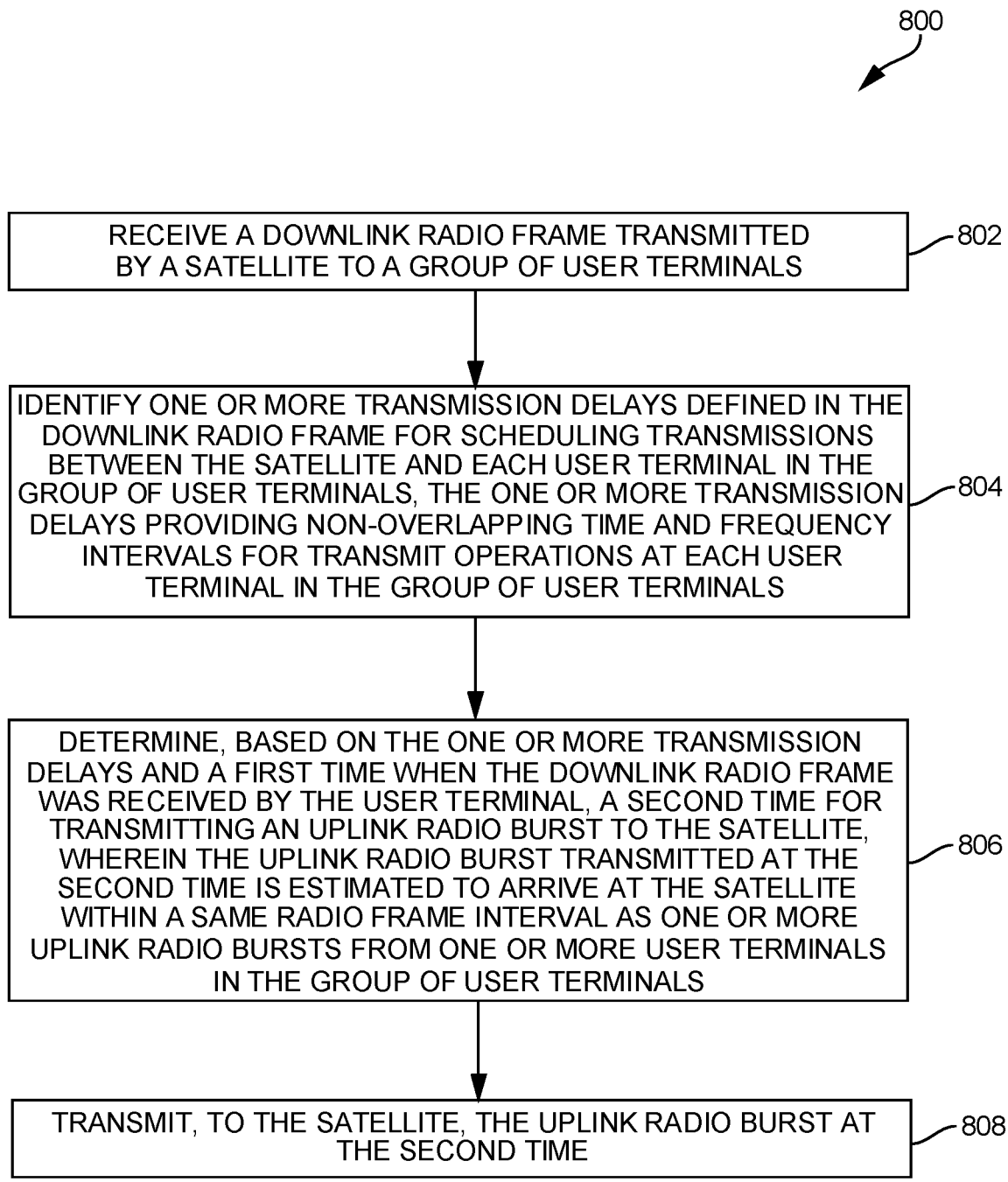
FIGS. 8A and 8B are flowcharts illustrating example methods and for timing multi-user transmissions in a wireless communication system, in accordance with some examples of the present disclosure.
Figure 8B:
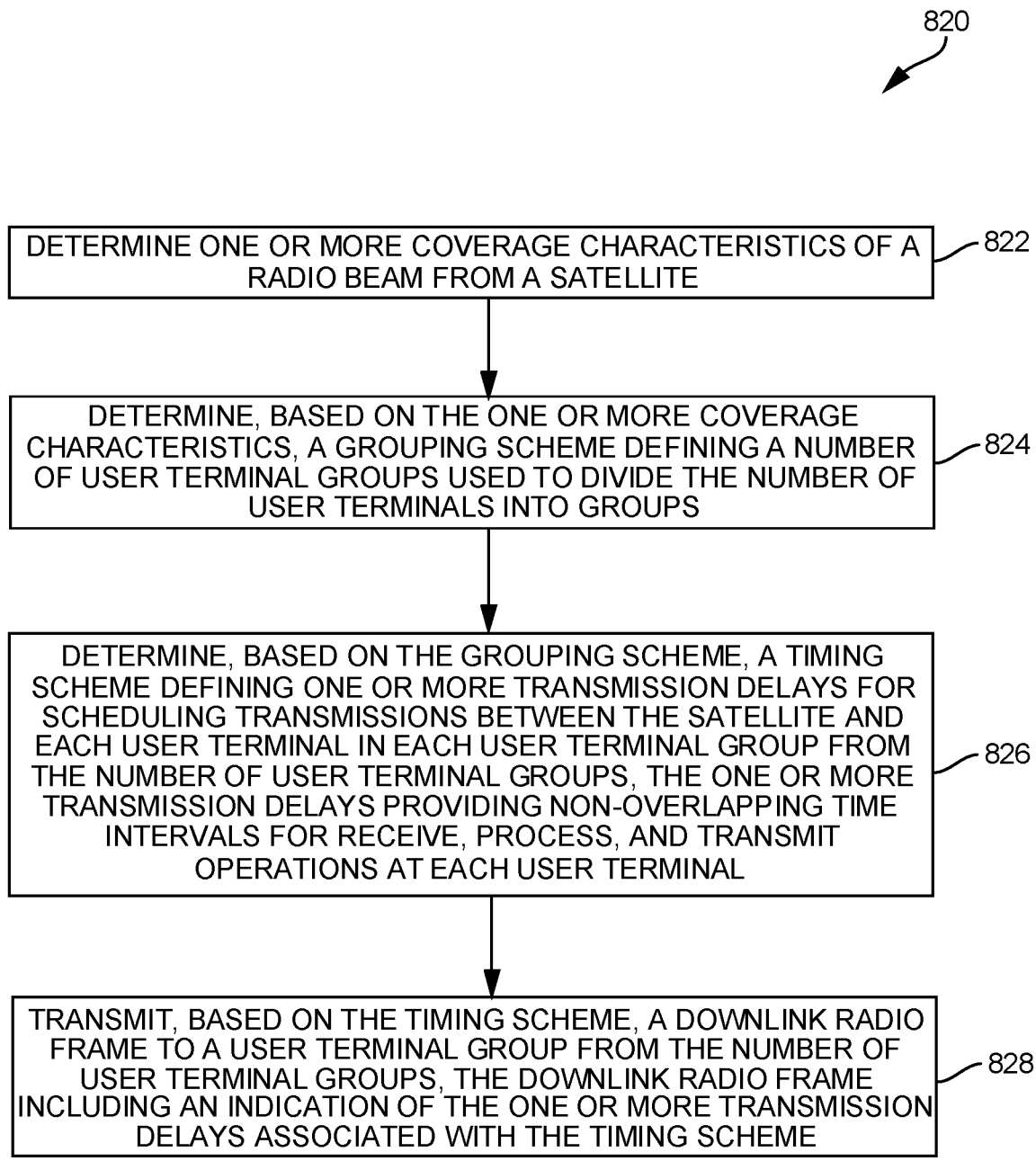
Figure 9:
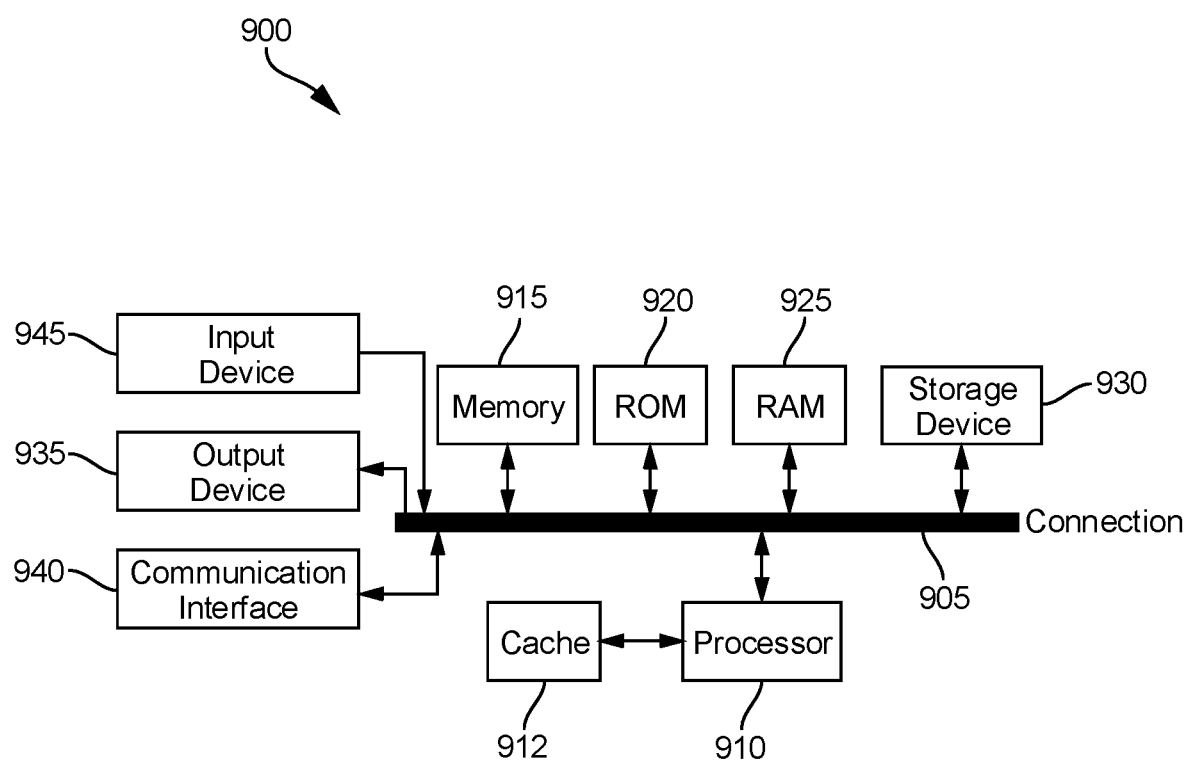
FIG. 9 illustrates an example computing device architecture, in accordance with some examples of the present disclosure.

The present technologies will be described in the following disclosure as follows. The discussion begins with a description of example systems and technologies for wireless communications and timing half-duplex transmissions, as illustrated in FIGS. 1A through 7. A description of example methods for timing half-duplex transmissions, as illustrated in FIGS. 8A and 8B, will then follow. The discussion concludes with a description of an example computing device architecture including example hardware components suitable for performing multi-user uplink time synchronization, as illustrated in FIG. 9. The disclosure now turns to FIG. 1A.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively "102"), one or more satellite access gateways (SAGs) 104A-104N (collectively "104"), user terminals (UTs) 112A-112N (collectively "112"), user network devices 114A-114N (collectively "114"), and a terrestrial network 120 in communication with a network 130. In some examples, the network 130 can include and/or represent the Internet. In other examples, the network 130 can include any other network(s).

The SATs 102 can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. Similarly, the SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, user equipment, antenna systems, communication nodes, base stations, access points, and/or any other suitable device or equipment. In some cases, the user terminals 112 and/or the SAGs 104 can perform phased-array beam-forming and digital-processing to support highly directive, steered antenna beams that track the SATs 102. Moreover, the user terminals 112 and/or the SAGs 104 can use one or more frequency bands to communicate with the SATs 102, such as the Ku and/or Ka frequency bands.

The user terminals 112 can be used to connect the user network devices 114 to the SATs 102 and ultimately the Internet (e.g., network 130). The SAGs 104 can be used to connect the terrestrial network 120 and the network 130 to the SATs 102. For example, the SAGs 104 can relay communications from the terrestrial network 120 and/or the network 130 to the SATs 102, and communications from the SATs 102 (e.g., communications originating from the user network devices 114, the user terminals 112, or the SATs 102) to the terrestrial network 120 and/or the network 130.

The user network devices 114 can include any electronic devices with networking capabilities and/or any combination of electronic devices such as a computer network. For example, the user network devices 114 can include routers, network modems, switches, access points, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles, robotic devices, user networks, etc. The terrestrial network 120 can include one or more networks and/or data centers. For example, the terrestrial network 120 can include a public cloud, a private cloud, a hybrid cloud, an enterprise network, a service provider network, an on-premises network, and/or any other network.

In some cases, the SATs 102 can establish communication links between the SATs 102 and the user terminals 112. For example, SAT 102A can establish communication links 116 between the SAT 102A and the user terminals 112A-D and/or 112E-N. The communication links 116 can provide communication channels between the SAT 102A and the user terminals 112A-D and/or 112E-N. In some examples, the user terminals 112 can be interconnected (e.g., via wired and/or wireless connections) with the user network devices 114. Thus, the communication links between the SATs 102 and the user terminals 112 can enable communications between the user network devices 114 and the SATs 102. In some examples, each of the SATs 102A-N can serve user terminals 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the user terminals 112 and the communication links between the SATs 102 and the SAGs 104 can allow the SAGs 104 and the user terminals 112 to establish a communication channel between the user network devices 114, the terrestrial network 120 and ultimately the network 130. For example, the user terminals 112A-D and/or 112E-N can connect the user network devices 114A-D and/or 114E-N to the SAT 102A through the communication links 116 between the SAT 102A and the user terminals 112A-D and/or 112E-N. The SAG 104A can connect the SAT 102A to the terrestrial network 120, which can connect the SAGs 104A-N to the network 130. Thus, the communication links 108 and 116, the SAT 102A, the SAG 104A, the user terminals 112A-D and/or 112E-N and the terrestrial network 120 can allow the user network devices 114A-D and/or 114E-N to connect to the network 130.

In some examples, a user can initiate an Internet connection and/or communication through a user network device from the user network devices 114. The user network device can have a network connection to a user terminal from the user terminals 112, which it can use to establish an uplink (UL) pathway to the network 130. The user terminal can wirelessly communicate with a particular SAT from the SATs 102, and the particular SAT can wirelessly communicate with a particular SAG from the SAGs 104. The particular SAG can be in communication (e.g., wired and/or wireless) with the terrestrial network 120 and, by extension, the Internet (e.g., network 130). Thus, the particular SAG can enable the Internet connection and/or communication from the user network device to the terrestrial network 120 and, by extension, the Internet (e.g., network 130).

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the network 130 is obtained for the user network device, the communication pathway can be reversed using the same or different SAT and/or SAG as used in the UL pathway.

Figure 2:
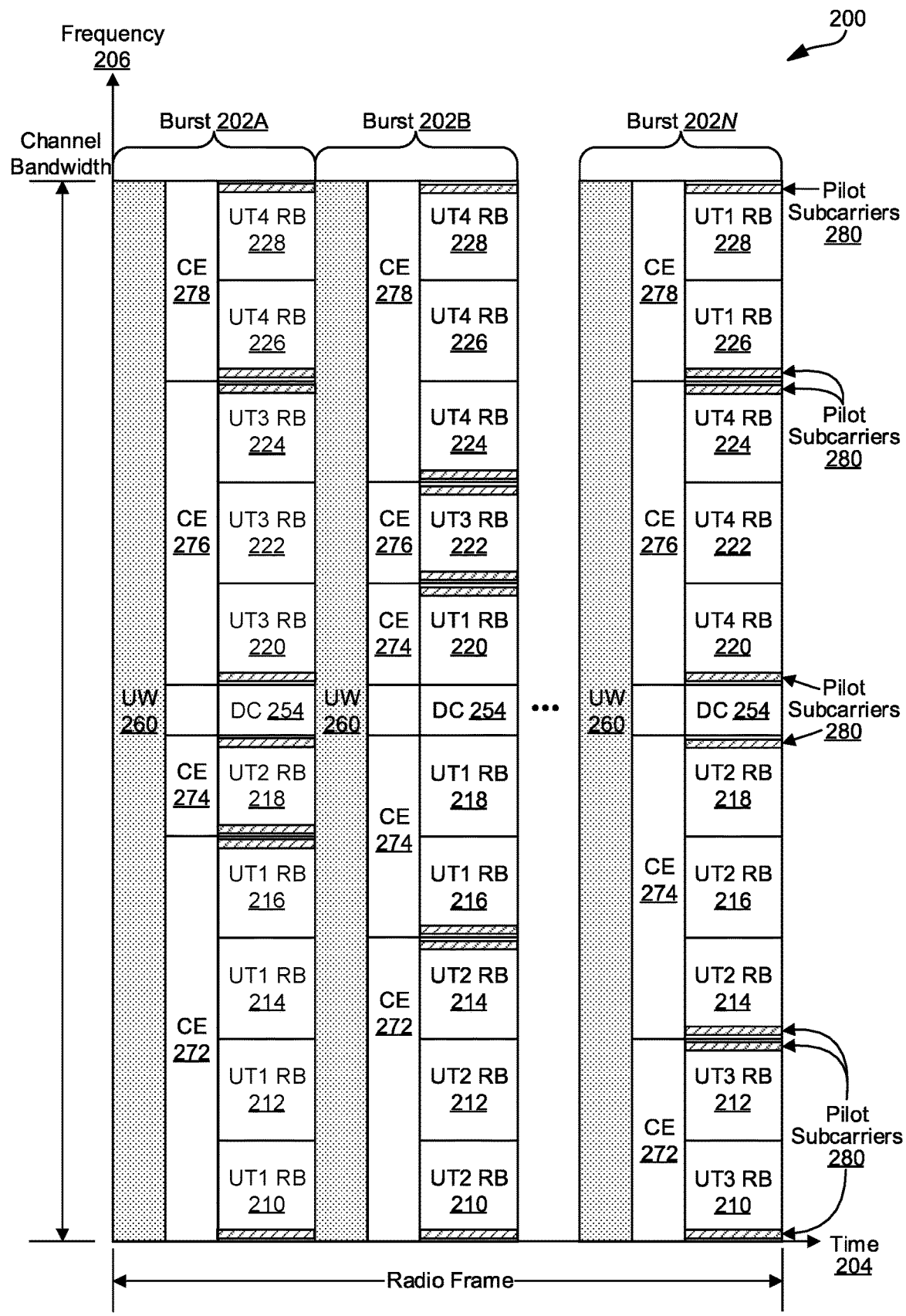
FIG. 2 illustrates an example configuration of a multi-user (MU) uplink (UL) radio frame, in accordance with some examples of the present disclosure.

In some examples, the communication links (e.g., 106, 108, and 116) in the wireless communication system 100 can operate using orthogonal frequency division multiple access (OFDMA) via both time domain and frequency domain multiplexing. OFDMA, also known as multicarrier modulation, transmits data over a bank of orthogonal subcarriers harmonically related by the fundamental carrier frequency. An example configuration of an OFDMA radio frame that can be used for communications in the wireless communication system 100 is shown in FIG. 2 and described below with respect to FIG. 2. Moreover, in some cases, for computational efficiency, fast Fourier transforms (FFT) and inverse FFT can be used for modulation and demodulation.

While the wireless communication system 100 is shown to include certain elements and components, one of ordinary skill will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
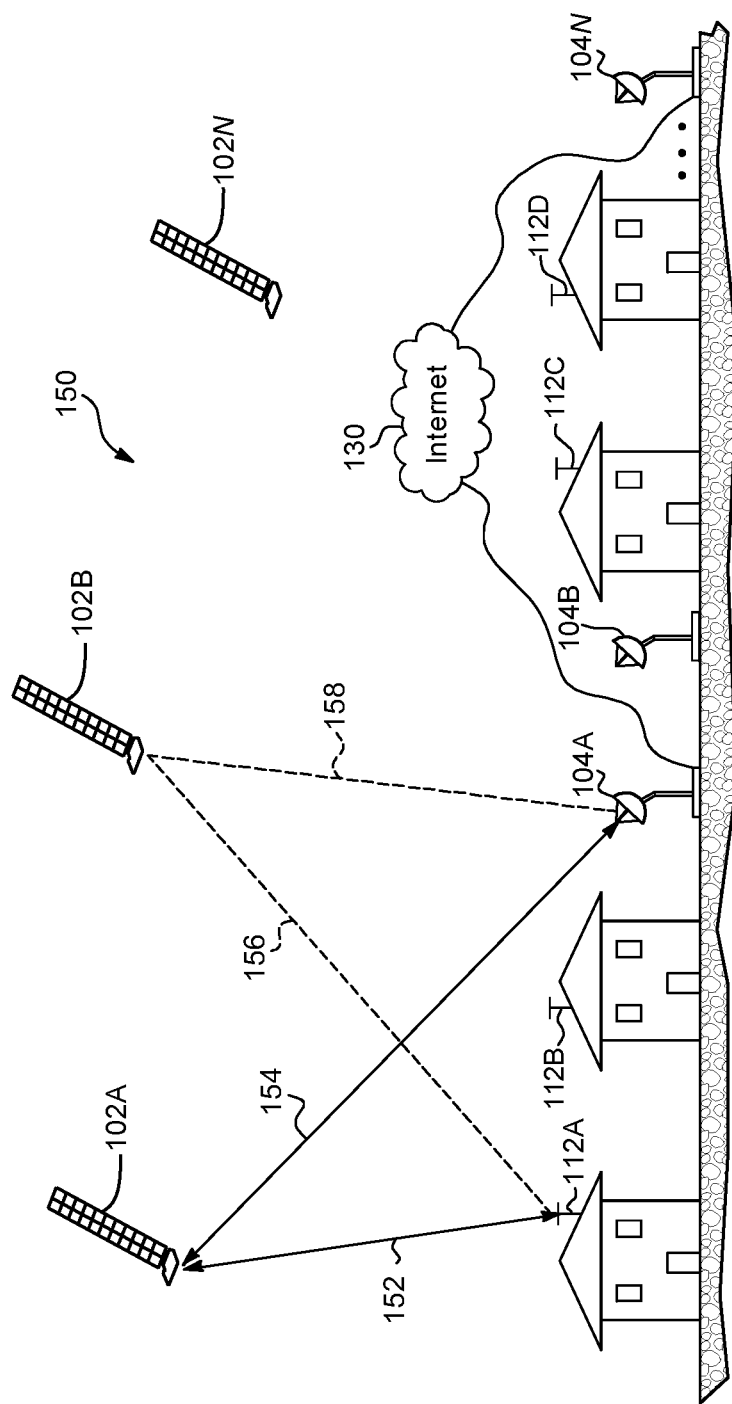
FIG. 1B is a simplified diagram illustrating an example of a satellite-based communications environment, in accordance with some examples of the present disclosure.

FIG. 1B is a diagram illustrating an example of a satellite-based communications environment 150, in accordance with various aspects of the present disclosure. The satellite-based communications environment 150 can include a plurality of SATs 102A-N orbiting Earth in, for example and without limitation, a non-geostationary orbit (NGO) constellation. In this example, three SATs (e.g., SAT 102A, 102B, and 102N) are shown for illustrative purposes. However, one of ordinary skill in the art will recognize that other examples can include more or less SATs than those shown in FIG. 1B.

The satellite-based communications environment 150 includes ground or Earth-based equipment configured to communicate with the SATs 102A-N. In some examples, such equipment can include user terminals (UTs) 112A-N and SAGs 104A-N. Each of the UTs 112A-N can be associated with a particular user. The UTs 112A-N can be configured to serve as a conduit between particular user networks and/or devices (e.g., 114A-N) and at least one of the SATs 102A-N in communication range of the UTs 112A-N, such that the particular user networks and/or device can have access to a network, such as the Internet (e.g., network 130). Each of the UTs 112A-N is particularly positioned in proximity to an associated user network and/or device. For example, each of the UTs 112A-N can be located on a respective user's building's roof, a yard of the user's building, etc. A variety of other locations are also contemplated for the UTs 112A-N.

At any given time, a particular SAT (102A, 102B, 102N) can be in communication with a given UT from the UTs 112A-N to facilitate a link to the network 130. For instance, a user device in proximity to UT 112A (e.g., and connected together via a wireless connection) requests to access the network 130 (e.g., request a web page). UT 112A can establish a communication link 152 to the SAT 102A and transmit the data request. SAT 102A, in response, can establish a communication link 154 with an SAG 104A to relay the data request. The SAG 104A can have a connection (e.g., wired or wireless) to the network 130.

The data associated with the request (e.g., the requested web page) can be returned in the reverse path, from the SAG 104A, communication link 154, SAT 102A, communication link 152, and UT 112A, to the originating user device. If SAT 102A moves out of position relative to UT 112A before the requested data can be provided to the UT 112A (or otherwise becomes unavailable), then SAG 104A can establish a communication pathway 156, 158 with a different SAT, such as SAT 102B, to provide the requested data.

In some aspects, one or more of the SAGs 104A-N can include repeaters that lack a wired connection to the network 130. A repeater can be configured to relay communications to and/or from a SAT that is a different SAT from the one that directly communicates with a UT or gateway. A repeater can be configured to be part of the communication pathway between a UT and gateway. A repeater may be accessed in cases where a SAT does not have access to a gateway, and thus has to send its communication to another SAT that has access to a gateway via the repeater. Repeaters can be located terrestrially, on water (e.g., on ships or buoys), in airspace below satellite altitudes (e.g., on an airplane or balloon), and/or other Earth-based locations. Accordingly, the SAGs 104A-N can also be referred to as Earth-based network nodes, Earth-based communication nodes, and/or the like. In some aspects, transmitter and receiver systems can be included in each UT, SAT, and gateway of the satellite-based communications environment 150.

While the satellite-based communications environment 150 is shown to include certain elements and components, one of ordinary skill will appreciate that the satellite-based communications environment 150 can include more or fewer elements and components than those shown in FIG. 1B. For example, the satellite-based communications environment 150 can include, in some instances, networks, cellular towers, communication hops or pathways, network equipment, and/or other electronic devices that are not shown in FIG. 1B.

Figure 3:
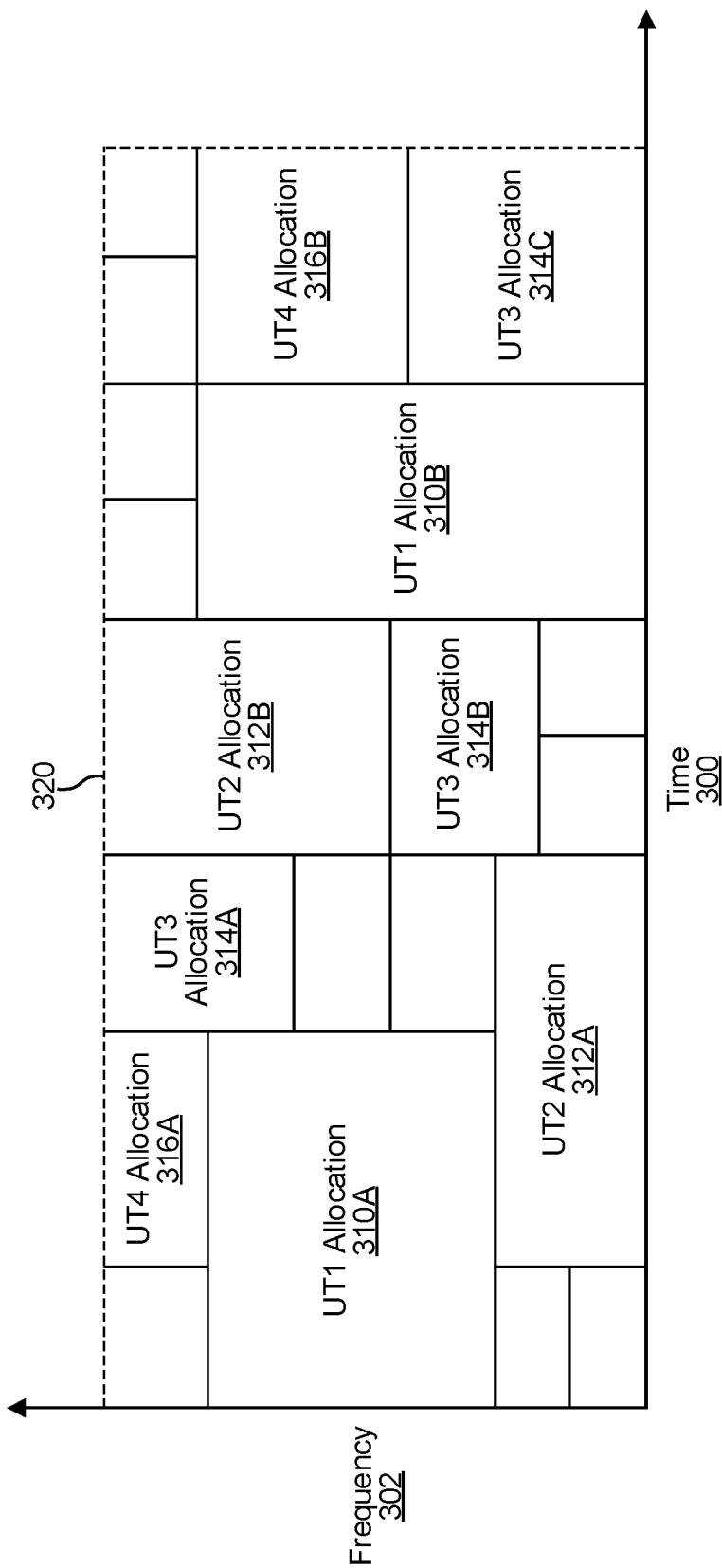
FIG. 3 is a diagram illustrating example orthogonal frequency-division multiple access (OFDMA) uplink transmissions from multiple user terminals synchronized within a radio frame along a time domain and a frequency domain, in accordance with some examples of the present disclosure.

FIG. 2 illustrates an example configuration of a multi-user (MU) uplink (UL) radio frame 200. In this example, the MU uplink radio frame 200 includes an OFDM signal structure, symbols and characteristics along a time domain 204 and a frequency domain 206. In some examples, the MU uplink radio frame 200 can include a superframe (e.g., a frame including sub-frames) having a length corresponding to a certain interval of time, synchronization period and/or time slots. In some examples, resources associated with the MU uplink radio frame 200 can be allocated to multiple user terminals as shown in FIG. 3.

The MU uplink radio frame 200 includes multiple bursts 202A through 202N, and each burst is allocated to different user terminals (e.g., UT1, UT2, UT3, UT4). Each of the user terminals is allocated contiguous resource blocks (RBs) and channel estimation (CE) symbols immediately adjacent to the allocated RBs. The RBs and CE symbols are allocated to the user terminals along the time domain 204 and the frequency domain 206.

For example, in burst 202A, RBs 210-216 and CE 272 are allocated to UT1 (e.g., UT 112A), RB 218 and CE 274 are allocated to UT2 (e.g., UT 112B), RBs 220-224 and CE 276 are allocated to UT3 (e.g., UT 112C), and RBs 226-228 and CE 278 are allocated to UT4 (e.g., UT 112D). In burst 202B, RBs 210-214 and CE 272 are allocated to UT2, RBs 216-220 and CE 274 are allocated to UT1, RB 222 and CE 276 are allocated to UT3, and RBs 224-228 and CE 278 are allocated to UT4. In burst 202N, RBs 210-212 and CE 272 are allocated to UT3, RB 214-218 and CE 274 are allocated to UT2, RBs 220-224 and CE 276 are allocated to UT4, and RBs 226-228 and CE 278 are allocated to UT1. As shown in FIG. 2, the allocations between user terminals from burst to burst can be flexible, which can allow for the allocations from burst to burst to vary or remain the same.

In some cases, the number of RBs between user terminals can vary depending on the payload sizes for the different user terminals. Moreover, in some cases, a burst (e.g., 202A, 202B, 202N) can include a different total number of RBs than those shown in FIG. 2. In some cases, if fewer than four user terminals is supported in a given burst, at least some RBs and adjacent CE symbol sections can be empty or otherwise denoted as empty or null.

Each of the bursts 202A-202N includes preamble and payload symbols. The preamble portion or block of a burst includes a unique word (UW) symbol 260 and a CE portion including CE symbols 272-278. The UW symbol 260 can be used for burst detection, symbol alignment, carrier frequency offset estimation, etc. The CE symbols 272-278 can provide a preview of channel characteristics for use in channel estimation and equalization. The payload symbols of a burst (also referred to as data symbols) can be located within a payload portion/block of the burst corresponding to the RBs 210-228.

The CE portion/block containing the CE symbols 272-278 of a burst can be located between the unique word portion/block (e.g., the UW symbol 260) and the payload portion/block (e.g., RBs 210-228) along the time domain 204. In other words, in the time domain 204, the unique word symbol 260 occurs first, followed by the CE symbols 272-278, and then followed by the RBs 210-228.

An OFDM and OFDMA signal allows certain subcarriers to be inactivated, and a configurable number of subcarriers can be disabled in order to avoid the region of spectrum around DC (also referred to as the DC, center, null, or zero subcarrier region) and/or disproportionately higher interference. Accordingly, in some examples, the MU uplink radio frame 200 can include an unused DC subcarrier 254, which can coincide with the carrier center frequency.

Pilot subcarriers 280 can be used to provide and track amplitude, timing, and phase changes throughout a burst. Each of the bursts 202A-N can have pilot subcarriers 280 defined for the burst. The pilot subcarriers 280 can each be offset from the band edges by a specified number of subcarriers. FIG. 2 shows pilot subcarriers 280 at the edges of the first and last RB allocated to each user terminal in the frequency domain. In some examples, the size of the pilot sub-bands and the offset from the band edges can be configurable. In some examples, for wide channel bandwidths, the information provided within pilot subcarriers for a given radio frame can be the same or can differ from each other.

FIG. 3 is a diagram illustrating an example allocation of resources to user terminals (e.g., UT1, UT2, UT3, UT4) for OFDMA uplink transmissions aligned within a same radio frame. The resource blocks can be allocated to the user terminals along a time domain 300 and a frequency domain 302. In this example, UT allocations 310A-B, 312A-B, 314A-C, 316A-B represent sets of contiguous time and frequency subcarriers (e.g., resource elements) assigned to the user terminals UT1 (e.g., user terminal 112A), UT2 (e.g., user terminal 112B), UT3 (e.g., user terminal 112C), and UT4 (e.g., user terminal 112D), which can allow the user terminals (UT1-4) to transmit signals to the SAT (e.g., SAT 102A) in parallel without interference. The UT allocations 310A-B, 312A-B, 314A-C, 316A-B can include RBs (e.g., 210, 212, 214, 216, 218, 220, 222, 224, 226, 228) associated with a radio frame (e.g., 200), with each UT allocation including a number of respective RBs allocated to a UT associated with that UT allocation.

The UT allocations 310A-B, 312A-B, 314A-C, 316A-B in this example are shown within a grid 320 including allocated and unallocated blocks or slots along the time domain 300 and the frequency domain 302. Each of the UT allocations 310A-B, 312A-B, 314A-C, 316A-B can include specific contiguous, non-overlapping blocks or slots, which can correspond to a number of time and frequency subcarriers along the time domain 300 and the frequency domain 302, which allows the user terminals to avoid or limit interference. Thus, based on the UT allocations 310A-B, 312A-B, 314A-C, 316A-B, uplink transmissions from the user terminals (UT1-4) can synchronized in time and frequency within the grid 320.

The uplink transmissions from the user terminals can be modulated using OFDMA, with each UT being assigned non-overlapping sets of contiguous time and frequency subcarriers (e.g., UT allocations 310A-B, 312A-B, 314A-C, 316A-B) to allow the UTs 1-4 (e.g., UTs 112A-D) to transmit together without interference. The uplink transmissions from the UTs 1-4 can then be separated by the receiver (e.g., SAT 102A) because the uplink transmissions are orthogonal and synchronized across the time domain 300 and the frequency domain 302.

For example, as shown by the UT allocations 310A-B, 312A-B, 314A-C, 316A-B in FIG. 3, the UTs 1-4 all have non-overlapping alignments in time and frequency along the time domain 300 and the frequency domain 302 for their respective uplink transmissions. This enables the multiple user terminals (UTs 1-4) to transmit in parallel or simultaneously without (or with limited) interference from the multiple transmissions.

In some cases, the different propagation delays of downlink and uplink transmissions associated with the user terminals (UTs 1-4), which can be caused by the respective distances between the user terminals (UTs 1-4) and the receiver (e.g., SAT 102A) as well as the effects of motion (e.g., Doppler shift) caused by the motion of the receiver relative to the user terminals, can cause synchronization problems such as misalignment or overlapping transmissions. For example, downlink and/or uplink propagation delays associated with the user terminals can cause misalignment of the UT allocations 310A-B, 312A-B, 314A-C, 316A-B. Such synchronization problems are exacerbated and/or particularly difficult in the context of satellite communications where the transmissions between a satellite and user terminals generally travel very far distances, which can further increase propagation delays, and where the receiving satellite moves at an extremely high velocity which can cause significant Doppler effects. Moreover, the timing of transmissions between a satellite and half-duplex user terminals can be further complicated by the inability of each half-duplex user terminal to send and receive data at the same time.

In some aspects, to increase bandwidth efficiency for communications between the satellite and user terminals and avoid synchronization problems and overlapping (in time) uplink and downlink transmissions at any user terminal, the user terminals can be divided into groups that use timing information to transmit, receive, and process data at different, respective time intervals and prevent overlapping downlink and uplink transmissions at any user terminal. Uplink transmissions sent by any of the groups of user terminals during a transmit period can be timed to reach the receiving satellite (e.g., SAT 102A) in a synchronized manner. Time offsets can be used to estimate when one or more groups of user terminals can send their uplink transmissions to the satellite so they are properly aligned according to the UT allocations 310A-B, 312A-B, 314A-C, 316A-B and accurately synchronized in time and frequency when received by the receiving satellite.

For example, time offsets can be used to define when user terminals can transmit respective uplink transmissions so they do not receive any downlink transmissions during their transmit period and prevent their uplink transmissions from being misaligned (e.g., in time and/or frequency) when received by the satellite so the satellite can separate the uplink transmissions without interference. In some cases, time offsets can also be used to define when the satellite can transmit and/or receive transmissions to ensure received transmissions are properly aligned in time and frequency and sent transmissions do not overlap at the user terminals with transmissions being sent by the user terminals. Such synchronization and timing of transmissions can allow more efficient use of a transmission channel as it enables the multiple user terminals to be allocated different time slots without (or with minimal) gaps between them.

The grouping of user terminals as previously described can also provide more efficient use of bandwidth, throughput optimization, and reduced communication latencies as the grouping allows more efficient sharing of bandwidth and reduces the overall down time (e.g., the amount of time that a user terminal is not transmitting, receiving, or processing data) for the user terminals. For example, the satellite can send and receive transmissions to and from user terminals within a cell (e.g., 110A, 110N) or user terminals within multiple cells (e.g., by hopping between cells or beam hopping). Thus, the satellite can serve one or more cells. If the user terminals within the one or more cells served by a satellite are divided into n groups of user terminals, then each group of user terminals can have a throughput of up to 1/n per beam, and lower groupings can lead to higher throughputs per group. Moreover, if the user terminals are not divided into groups and the user terminals are half-duplex terminals, then all user terminals will transmit, receive, and process data at the same time window, which leads to a significant amount of wasted or idle time.

To illustrate, if the satellite broadcasts a beam to all the user terminals in the one or more cells served by the satellite, the user terminals will all be in receive mode (e.g., the user terminals will have their antennas in receive mode as they wait for and receive the beam from the satellite), waiting to receive the beam from the satellite. This will result in a certain amount of time being wasted while the user terminals wait for and receive the beam, as none of the user terminals will transmit or process data while they are in receive mode, waiting to receive and process the beam from the satellite, and as user terminals with shorter propagation delays are delayed by user terminals with longer propagation delays.

After the user terminals receive the beam, the user terminals will process the beam and prepare their uplink transmissions to the satellite. However, while the user terminals are processing data, a certain amount of time will be wasted as there are no user terminals receiving another beam from the satellite and/or sending uplink transmissions to the satellite. Similarly, while the user terminals are sending uplink transmissions to the satellite, a certain amount of time will be wasted as there are no user terminals receiving another beam from the satellite or processing other transmissions. Moreover, when the user terminals send their uplink transmissions to the satellite, the available bandwidth will be shared by all the user terminals in the one or more cells. Thus, the lack of groupings of user terminals can not only reduce the amount of bandwidth across all the user terminals but can also cause significant inefficiencies and increase overall round-trip times for the user terminals, which can lead to increased latencies for the user terminals and time wasted without user terminals being able to receive, process, or transmit additional data.

On the other hand, by splitting user terminals within the one or more cells into groups that transmit, receive, and process data at different times, the communication latencies and processing inefficiencies can be reduced, and the bandwidth available to each user terminal can be increased. For example, assume that for every radio frame time window, the user terminals within the one or more cells are divided into three groups. During each radio frame time window, a first group of user terminals can transmit uplink radio frames to the satellite, a second group of user terminals can process transmissions to or from the satellite, and a third group can receive downlink radio frames from the satellite. The operations and/or actions performed by the different groups of user terminals can rotate after each radio frame. To illustrate, at a next radio frame, the first group can switch from transmit to receive, the second group can switch from process to transmit, and the third group can switch from receive to process.

In this illustrative example, any time a group of user terminals is in receive mode waiting to receive a downlink radio frame, other groups of user terminals can be processing or transmitting data. Thus, the grouping of user terminals in this example can significantly reduce the amount of time wasted without user terminals being able to receive, process or transmit data. Moreover, the grouping of user terminals in this example can allow more efficient use of bandwidth, as the available bandwidth can be more evenly shared or distributed between the different groups of user terminals. To properly coordinate transmit, processing, and receive periods between the groups of user terminals, timing information can be calculated to account for processing, propagation, and any other delays and align or time different activities such that receive, transmit, and processing periods for any group of user terminals never overlap.

The number and/or configuration of groups of user terminals can be determined based on various factors and/or strategies. For example, in some cases, the total number of user terminals in one or more cells served by a satellite can be evenly divided across a number of groups. In another example, user terminals can be assigned to specific groups based on, for example, bandwidth requirements, their position within a cell, among other factors. Moreover, the number of groups implemented at any moment can be determined based on one or more factors such as, for example and without limitation, the number of cells served by the satellite, the range(s) of propagation delays associated with the user terminals served by the satellite, etc. In some cases, as further described herein, the number of groups implemented can dynamically vary based on one or more factors and/or conditions, to ensure the most reliable and/or efficient grouping supported is implemented at any given time.

Figure 4:
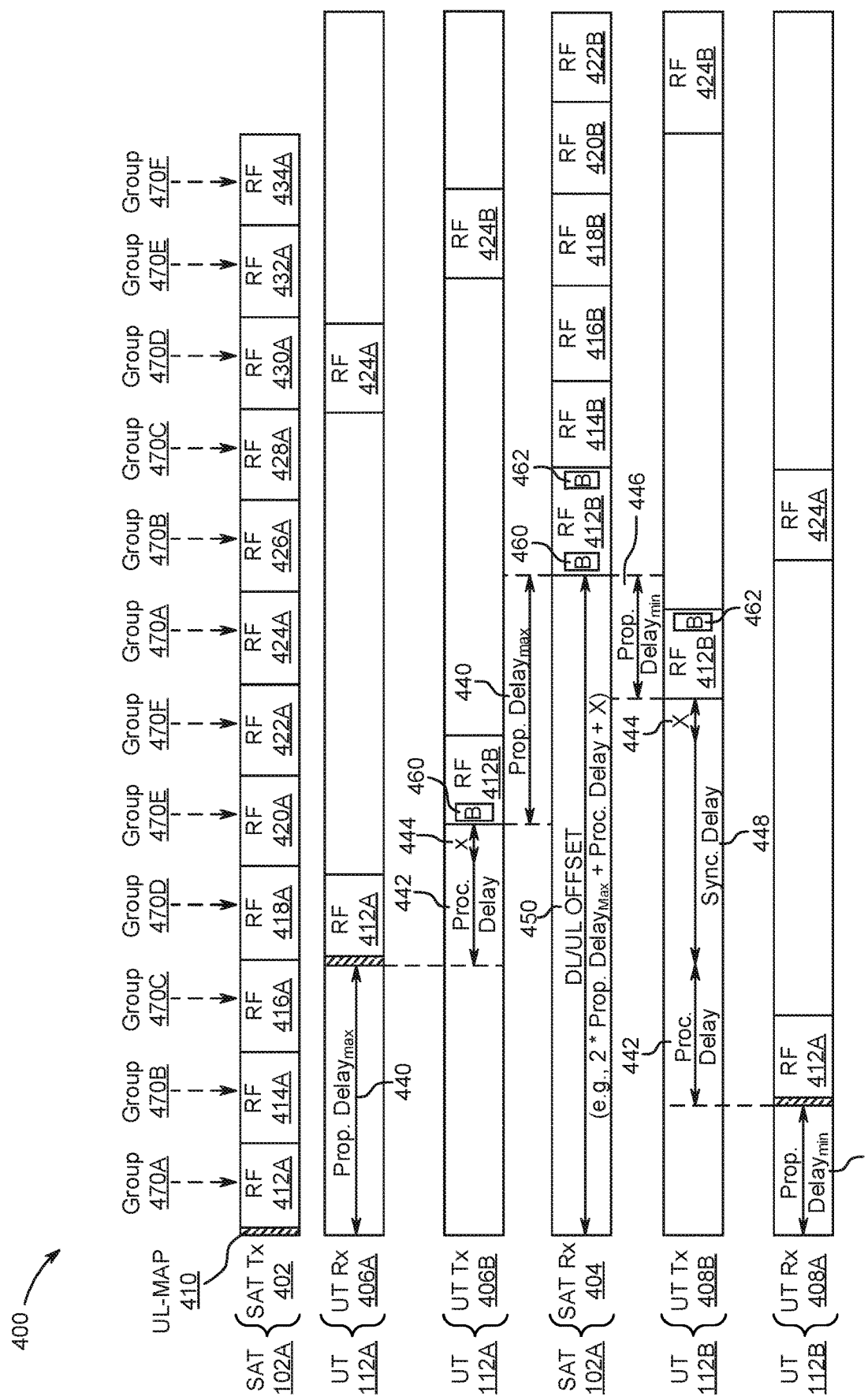
FIG. 4 is a diagram illustrating an example grouping scheme for dividing user terminals into groups and coordinating or scheduling receive, process, and transmit operations across the groups of user terminals to avoid overlapping receive, process, or transmit operations at any user terminal, in accordance with some examples of the present disclosure.

FIG. 4 is a diagram illustrating an example grouping scheme 400 for dividing user terminals into groups and coordinating or scheduling receive, processing, and transmit operations across the groups of user terminals to avoid overlapping receive, processing, or transmit operations at any user terminal. The grouping scheme 400 is shown in this example from the perspective of the SAT 102A. Moreover, the grouping scheme 400 can be based on a fixed timing scheme for scheduling (or performing) communications between the SAT 102A and user terminals in the various groups.

In the example grouping 400, the user terminals (e.g., 112A through 112N) served by SAT 102A are divided into six groups of user terminals, including group 470A through 470F. The SAT 102A and/or groups 470A-F in the grouping 400 can use specific timing information to determine when to send and/or receive transmissions between the SAT 102A and UTs in the groups 470A-F. For example, specific timing information can be used to ensure that transmit, processing, and receive operations (and/or associated time windows) at any UT do not overlap or are too close in time to allow the UT to switch from transmit mode to receive mode or vice versa.

In some cases, the timing information can also be used to manage when uplink transmissions from UTs to the SAT 102A are transmitted (and/or when uplink transmissions are received by the SAT 102A) to ensure that uplink transmissions from a group of UTs are aligned within a same radio frame when they arrive at the SAT 102A so the SAT 102A can properly decode the uplink transmissions from the group of UTs. Transmissions between the SAT 102A and UTs can be aligned in time within radio frame boundaries corresponding to time windows associated with the radio frames to prevent interference caused by misalignment of transmissions and ensure the SAT 102A can properly decode the transmissions without errors or degradations. For example, uplink transmissions from UTs to the SAT 102A can be aligned in time so they arrive at the SAT 102A within a same radio frame (e.g., a same time window represented by a radio frame), and a downlink transmission from the SAT 102A to a group of UTs can be aligned in time (or transmitted) within a radio frame (e.g., within a time window of a radio frame). The data associated with a transmission (e.g., a beam) from the SAT 102A to UTs can be aligned within (and contained within) the radio frame (e.g., within the time window of a radio frame), and the data associated with transmissions (e.g., uplink radio bursts) from UTs to the SAT 102A can be aligned with (and contained within) a same radio frame (e.g., the time window of a radio frame).

In the example grouping 400, the timing information used to coordinate and/or define when each group (e.g., 470A-F) receives, processes, and transmits data can be based on, or can include, fixed SAT transmit timing information, which can define when the SAT 102A can transmit downlink radio frames to the groups 470A-F and/or time intervals for downlink radio frames transmitted by the SAT 102A to the groups 470A-F. The fixed SAT transmit timing information can be fixed in relation to absolute time at the SAT 102A and/or timing for receiving uplink radio frames at the SAT 102A (e.g., SAT receive timing) from the groups 470A-F.

The fixed SAT transmit timing information and/or the time intervals for downlink radio frames from the SAT 102A can also define, impact, depend on, serve as a reference point for, and/or drive the timing for receiving uplink radio frames at the SAT 102A (e.g., SAT receive timing) from the groups 470A-F, the timing for receiving downlink radio frames from the SAT 102A at the groups 470A-F of user terminals (e.g., UT receive timing), the timing for transmitting uplink radio frames from UTs in the groups 470A-F to the SAT 102A (e.g., UT transmit timing), and/or the timing for processing data at the UTs in the groups 470A-F (e.g., UT processing timing).

The number of groups in the grouping 400 can be determined using a grouping factor, which can include one or more grouping variables. In some examples, the grouping factor used to determine the number of groups can include, or can be based on, a maximum propagation delay and/or the range of propagation delays associated with communications between the SAT 102A and the user terminals in one or more cells (e.g., 110A, 110N) served by the SAT 102A. Thus, the number of groups (e.g., six in this example) can be determined at least partly based on the maximum propagation delay and/or the range of propagation delays associated with communications between the SAT 102A and the user terminals in one or more cells (e.g., 110A, 110N) served by the SAT 102A.

For example, the different user terminals in the one or more cells served by the SAT 102A can have different propagation delays based on their relative proximity to the SAT 102A. To illustrate, if the SAT 102A is currently located above a center of a cell, the user terminals located at or near the center of the cell will experience shorter propagation delays when communicating with the SAT 102A than user terminals located at the outer edges of the cell, as the user terminals at or near the center of the cell will be closer to the SAT 102A than those located at the outer edges of the cell. As the SAT 102A moves, the relative distance of the SAT 102A and user terminals can change, which can also impact the relative propagation delays of the user terminals.

Accordingly, the range of propagation delays associated with the user terminals served by the SAT 102A can depend on the relative distances between the user terminals and the SAT 102A and/or the size and/or number of cells served by the SAT 102A. In some examples, the maximum propagation delay of all user terminals served by the SAT 102A and/or the difference between the maximum propagation delay and a lowest propagation delay of the user terminals can be used to determine the number of groups implemented in a fixed timing scheme (e.g., a fixed SAT transmit timing scheme) for grouping user terminals and coordinating receive, process, and transmit operations.

The number of groups implemented can increase or decrease communication latencies and data throughput for the groups. For example, the maximum data throughput for each group can be 1/N, where N represents the number of groups implemented. Thus, a lower number of groups can result in higher data throughputs for the groups. In addition, lower numbers of groups can increase overall efficiency and reduce latencies, as the time intervals for switching between operations (e.g., receiving, processing, transmitting) can be reduced, resulting in less time wasted by each group/UT and more time actively conducting transmit, processing, and receive operations.

However, the range of propagation delays supported by the SAT 102A in a fixed timing scheme for grouping user terminals and coordinating receive, process, and transmit operations can impose limits on the number of groups that can be implemented. For example, in a fixed timing scheme such as the fixed SAT transmit scheme in the grouping 400, the maximum propagation delay associated with the user terminals served by the SAT 102A can limit how much the grouping (e.g., the number of groups implemented) can be reduced (and/or how much the time intervals can be reduced between receive, processing, and transmit operations for each group) while still allowing uplink transmissions from each group of user terminals to be aligned within a same radio frame when received by the SAT 102A and while still preventing overlapping of transmit, processing, and/or receive operations at user terminals in the groups.

In some examples, if delays provided by the timing information implemented in a fixed timing scheme causes the time intervals between receive, process, and transmit operations at a UT to be reduced below the smallest time interval that can support communications with the maximum propagation delay, the fixed timing scheme can result in overlapping receive, processing, and/or transmit operations at user terminals and/or misalignment of uplink radio frames from groups of user terminals. Accordingly, in fixed timing schemes, the timing information can incorporate and/or account for the maximum propagation delay experienced by all user terminals served by the SAT 102A in order to avoid overlapping receive, processing, and/or transmit operations at any group and/or user terminal and ensure that uplink transmissions from each group are aligned within a same radio frame when received by the SAT 102A. In other words, the timing information can provide delays that ensure that the round-trip time (RTT) of communications between the SAT 102A and any group and/or user terminal does not fall below the RTT of communications having the maximum uplink and downlink propagation delays.

As previously noted, in FIG. 4, the user terminals in the one or more cells (e.g., 110A, 110N) served by the SAT 102A are divided into six groups, including groups 470A-F. In some cases, the user terminals in the groups 470A-F can include all user terminals in the one or more cells served by the SAT 102A. Moreover, in some cases, the user terminals can be assigned to the groups 470A-F based on a certain distribution (e.g., an even distribution, an uneven distribution, or any distribution) of the user terminals across the six groups; namely, groups 470A through 470F. For example, if there are thirty user terminals in the one or more cells served by the SAT 102A, each of the six groups 470A-F can be assigned five user terminals to yield six groups of five user terminals. The user terminals assigned to each group can be randomly selected or selected based on one or more factors such as, for example, bandwidth requirements associated with the user terminals, a respective location of the user terminals within their cell and/or relative to the SAT 102A, among others. In another illustrative example, the thirty user terminals can be divided across the six groups 470A-F such that one or more groups may be assigned a different number of user terminals than one or more other groups.

In some examples, specific user terminals can be assigned to specific groups based on one or more factors associated with the user terminals. For example, user terminals can be assigned to specific groups based on bandwidth requirements associated with the user terminals, the respective positions of the user terminals within a respective cell served by the SAT 102A (which can affect the respective propagation delays of those user terminals), and/or any other condition or user terminal characteristic.

The groups 470A-F are assigned to (or scheduled to communicate within) radio frames 412-434 in a SAT transmit (Tx) sequence 402 of radio frames at the SAT 102A. FIG. 4 shows the SAT Tx sequence 402, as well as a SAT receive (Rx) sequence 404 for SAT 102A, a UT Rx sequence 406A for UT 112A, a UT Tx sequence 406B for UT 112A, a UT Rx sequence 408A for UT 112B, and a UT Tx sequence 408B for UT 112B. The SAT Tx sequence 402 represents a sequence of Tx radio frames 412A-434A for downlink transmissions from the SAT 102A to the user terminals in groups 470A-F.

For example, group 470A can be assigned to Tx radio frames 412A and 424A, group 470B can be assigned to Tx radio frames 414A and 426A, group 470C can be assigned to Tx radio frames 416A and 428A, group 470D can be assigned to Tx radio frames 418A and 430A, group 470E can be assigned to Tx radio frames 420A and 432A, and group 470F can be assigned to Tx radio frames 422A and 434A. Thus, the SAT 102A can send first and second downlink transmissions to group 470A within Tx radio frames 412A and 424A respectively, first and second downlink transmissions to group 470B within Tx radio frames 414A and 426A respectively, first and second downlink transmissions to group 470C within Tx radio frames 416A and 428A respectively, first and second downlink transmissions to group 470D within Tx radio frames 418A and 430A respectively, first and second downlink transmissions to group 470E within Tx radio frames 420A and 432A respectively, and first and second downlink transmissions to group 470F within Tx radio frames 422A and 434A respectively.

Each of the Tx radio frames 412A-434A can include a respective UL-MAP message 410 at the start of the radio frame, which indicates to each user terminal in the group (e.g., 470A, 470B, 470C 470D 470E, or 470F) associated with that radio frame when the user terminal should transmit an uplink radio frame to the SAT 102A so the uplink radio frame is received by the SAT 102A within a receive (Rx) radio frame (e.g., 412B, 414B, 416B, 418B, 420B, 422B) associated with (e.g., allocated or corresponding to) that user terminal's group. In some examples, the information indicating when the user terminal should transmit an uplink radio frame can include a DL/UL (downlink/uplink) offset 450 which can identify a time and/or an amount of delay that the user terminal can use to determine when to transmit the uplink radio frame, as further described below. Moreover, each of the Tx radio frames 412A-434A can include information indicating to each user terminal in the group which portion(s) of the radio frame is/are for that user terminal (e.g., are allocated or correspond to that user terminal). In some examples, a header that precedes the data encompassed within the radio frame can indicate which portion of the data is for each specific user terminal in the group.

The UT Rx sequence 406A illustrates when the UT 112A receives the Tx radio frames 412A and 424A sent by the SAT 102A to the group 470A which, in this example, includes UT 112A. The UT Rx sequence 406A also shows a propagation delay (Prop. Delay) 440 experienced by the UT 112A when receiving the Tx radio frames 412A and 424A from the SAT 102A. The propagation delay 440 can represent the amount of time it takes for a transmission from the SAT 102A to reach the UT 112A, and vice versa. For example, if the Tx radio frame 412A takes 3.8 milliseconds (ms) to reach the UT 112A from the time the SAT 102A transmitted the Tx radio frame 412A, the propagation delay 440 would be 3.8 ms.

The propagation delay 440 can vary between user terminals and can depend on one or more factors such as, for example and without limitation, the position of the UT 112A relative to the SAT 102A and consequently the distance between the SAT 102A and the UT 112A. Thus, the propagation delay of a UT can increase as the distance between the UT and the SAT 102A increases, or decrease as the distance between the UT and the SAT 102A decreases. In some cases, the SAT 102A can direct the beam associated with a radio frame (e.g., 412A) towards a particular area/location within a cell and/or can transmit the beam associated with the radio frame when the SAT 102A is above a particular area/location within the cell. For example, the SAT 102A can direct the beam to a center of the cell and/or transmit the beam when the SAT 102A is above the center of the cell. Accordingly, in some examples, A UT's location within the cell can affect the propagation delay (e.g., 440, 446) experienced by that UT. For example, if the SAT 102A directs a beam towards a center of the cell and/or transmits the beam when the SAT 102A is above a center of the cell, then UTs located near the center of the cell may experience a shorter propagation delay than UTs located towards the edges of the cell.

The UT Rx sequence 408A illustrates the sequence and relative time (relative to UT 112A) in which the UT 112B receives the Tx radio frames 412A and 424A sent by the SAT 102A to the group 470A which, in this example, includes UT 112B. The UT Rx sequence 408A also shows a propagation delay 446 of the Tx radio frame 412A (and the Tx radio frame 424A) from the SAT 102A to the UT 112B. In this example, the propagation delay 446 associated with UT 112B is shorter than the propagation delay 440 associated with UT 112A. For example, in the illustrative example shown in FIG. 4, the propagation delay 440 associated with UT 112A is the maximum or highest propagation delay from the propagation delays associated with the UTs in the group 470A and/or the UTs in the one or more cells served by the SAT 102A. On the other hand, the propagation delay 446 associated with UT 112B is the minimum or lowest propagation delay from the propagation delays associated with the UTs in the group 470A and/or the UTs in the one or more cells served by the SAT 102A.

Accordingly, in this example, UT 112A is associated with the maximum or highest propagation delay and UT 112B is associated with the minimum or lowest propagations delay.

Such differences in propagation delays can cause transmissions to and from the UTs 112A and 112B to become misaligned in time and out of synchrony, which can lead to interference, decoding errors, and/or an overlap between receive, process, and/or transmit operations at the UT 112A and/or 112B. Therefore, as further explained below, the timing information and strategies implemented herein can take such differences in propagation delays into account to prevent transmissions from becoming misaligned in time or out of synchrony.

Variations in propagation delays between user terminals can depend on one or more factors such as, for example and without limitation, the position of the UT relative to the SAT and consequently the distance between the SAT and the UT. Thus, the propagation delay of a UT can increase as the distance between the UT and the SAT increases, or decrease as the distance between the UT and the SAT decreases. In some cases, the SAT can direct the beam associated with a radio frame towards a particular area/location within a cell and/or can transmit the beam associated with the radio frame when the SAT is above a particular area/location within the cell. For example, the SAT can direct the beam to a center of the cell and/or transmit the beam when the SAT is above the center of the cell.

Thus, in some examples, A UT's location within the cell can affect the propagation delay experienced by that UT. For example, if the SAT directs a beam towards a center of the cell and/or transmits the beam when the SAT is above the center of the cell, then UTs located near the center of the cell may experience a shorter propagation delay than UTs located towards the edges of the cell. Accordingly, since the propagation delay 446 in this example is shorter than the propagation delay 440, the difference in propagation delays 440 and 446 can indicate that, between UTs 112A and 112B, UT 112B is closer in distance to the SAT 102A and/or the location/area within the cell where the beams associated with the Tx radio frames 412A and 424A are directed.

The UT Tx sequence 406B illustrates when the UT 112A can transmit uplink radio bursts after receiving Tx radio frames 412A and 424A so the uplink radio bursts arrive within Rx radio frames 412B and 424B when they arrive at the SAT 102A. As illustrated, UT 112A can receive the Tx radio frame 412A after the propagation delay 440. Before transmitting a burst (b) 460 associated with the Tx radio frame 412A received, the UT 112A will have a processing delay (Proc. Delay) 442 corresponding to the amount of time it takes the UT 112A to process/decode the Tx radio frame 412A and built the burst 460 for transmission to the SAT 102A. Moreover, since UT 112A in this example is a half-duplex UT, the UT 112A will also have a transition delay (X) 444 corresponding to an amount of time for the UT 112A to switch from a receiving mode to a transmitting mode. In other words, since UT 112A is a half-duplex UT, the UT 112A may need time to do a hardware switch from receive to transmit. The transition delay 444 can thus account for the time used to perform the hardware switch.

After the processing delay 442 and the transition delay 444, the UT 112A can transmit the burst 460 to the SAT 102A, which can arrive at the SAT 102A after the propagation delay 440. The burst 460 can arrive at the SAT 102A within the Rx radio frame 412B associated with the group 470A. Thus, the amount of time it takes the burst 460 to reach the SAT 102A from the time the SAT 102A transmits the Tx radio frame 412A to the group 470A can be calculated by adding the propagation delay 440 corresponding to the amount of time it takes the UT 112A to receive the Tx radio frame 412A after it is transmitted by the SAT 102A, the processing delay 442, the transition delay 444, and another propagation delay 440 corresponding to the amount of time it takes the burst 460 to reach the SAT 102A after it is transmitted by the UT 112A. Accordingly, the burst 460 can be timed to arrive at the SAT 102A within the Rx radio frame 412B (along with any other bursts from other UTs in the group 470A) based on the propagation delay 440 for the downlink transmission (e.g., Tx radio frame 412A), the processing delay 442, the transition delay 444, and the propagation delay for the uplink transmission (e.g., burst 460).

In some examples, UTs in a group (e.g., UTs in group 470A) can use a DL/UL (downlink/uplink) offset 450 to determine when to transmit uplink bursts to the SAT 102A so they arrive at the SAT 102A within the same radio frame (e.g., Rx radio frame 412B) and/or how to time the uplink bursts to the SAT 102A so they arrive within the same radio frame. In some cases, the SAT 102A can also use the DL/UL offset 450 to determine when to transmit downlink radio frames to UTs in a group. The DL/UL offset 450, which is illustrated in the SAT Rx sequence 404, can be calculated by multiplying the maximum propagation delay (e.g., propagation delay 440) by two (2) to account for the maximum downlink and uplink propagation delays, and adding the result to the processing delay 442 and the transition delay 444.

For example, as previously explained, the amount of time it takes the burst 460 from UT 112A to reach the SAT 102A from the time the SAT 102A transmits the Tx radio frame 412A includes the propagation delay 440 of the Tx radio frame 412A from the SAT 102A to the UT 112A, the processing delay 442, the transition delay 444, and another propagation delay 440 for the burst 460 from the UT 112A to the SAT 102A. As illustrated in the UT Tx sequence 406B, the amount of time it takes the burst 460 from the UT 112A, which as noted earlier has the maximum or highest propagation delay, to reach the SAT 102A comports or is consistent with the DL/UL offset 450 shown in the SAT Rx sequence 404.

In some examples, the SAT 102A can provide the DL/UL offset 450 to UTs in a group within a downlink radio frame. For example, the SAT 102A can provide the DL/UL offset 450 to the UTs in group 470A within the UL-MAP 410 in Tx radio frame 412A. Moreover, the UTs in a group (e.g., 470A, 470B, 470C, 470D, 470E, 470F) can use the DL/UL offset 450 to determine when to send their uplink bursts to the SAT 102A so they arrive within the uplink bursts from the UTs in the same group arrive within a same radio frame. As previously explained, the DL/UL offset 450 can allow UTs in a group to time their uplink bursts from the time the SAT 102A sends a downlink radio frame to the group (e.g., Tx radio frame 412A to group 470A), so the uplink bursts can arrive at the SAT 102A within a same radio frame associated with that group (e.g., within Rx radio frame 412B associated with group 470A).

UT Tx sequence 408B similarly illustrates how UT 112B can time a burst 462 to the SAT 102A to ensure it also arrives within Rx radio frame 412B. As illustrated in the UT Tx sequence 408B, the amount of time it takes for the burst 462 from UT 112B to reach SAT 102A is consistent with the DL/UL offset 450.

For example, the UT Rx sequence 408A illustrates the sequence of Tx radio frames 412A and 424A received by the UT 112B from SAT 102A. Here, the UT 112B receives the Tx radio frame 412A from the SAT 102A after the propagation delay 446 associated with the UT 112B. In this example, the propagation delay 446 is shorter than the propagation delay 440 associated with the UT 112A. In some examples, the propagation delay 446 can represent a minimum or lowest propagation delay from all the propagation delays for all the UTs in group 470A and/or the one or more cells served by the SAT 102A. After receiving the Tx radio frame 412A, the UT 112A can spend the processing delay 442 to process/decode the Tx radio frame 412A and prepare the burst 462. The transition delay 444 can account for the additional delay in switching from receive mode to transmit mode as previously explained. Moreover, when the UT 112B transmits the burst 462 to the SAT 102A, the burst 462 will take the propagation delay 446 to reach the SAT 102A.

However, since the propagation delay 446 associated with the UT 112B is shorter than the propagation delay 440 associated with the UT 112A, the burst 462 from the UT 112B can implement a synchronization delay (Sync. Delay) 448 to account for the difference between the propagation delay 440 and the propagation delay 446 so the burst 462 transmitted by the UT 112B arrives at the SAT 102A within the same radio frame as the burst 460 from the UT 112A; namely, Rx radio frame 412B. Thus, the UT 112B can implement the synchronization delay 448 to delay the transmission of the burst 462 to account for the difference between the propagation delays 440 and 446 for both the downlink and uplink paths. In some examples, the synchronization delay 448 can be calculated by multiplying the difference between the maximum propagation delay (e.g., propagation delay 440) and the minimum propagation delay (e.g., propagation delay 446) by two (2) to account for the downlink and uplink paths.

For instance, in the example shown in FIG. 4, the synchronization delay 448 can be calculated by multiplying the difference between the propagation delay 440 of the UT 112A and the propagation delay 446 of the UT 112B by two (2). To illustrate, if the propagation delay 440 of the UT 112A is 3.8 ms and the propagation delay 446 of the UT 112B is 1.8 ms, the synchronization delay 448 can equal 2*(3.8 ms-1.8 ms), which yields a synchronization delay 448 of 4 ms.

The synchronization delay 448 combined with the propagation delay 446, the processing delay 442, and the transition delay 444 can represent the amount of time it takes, from the time the SAT 102A transmitted the Tx radio frame 412A to group 470A, for the burst 462 from UT 112B to arrive at the SAT 102A according to the example timing scheme described herein. In other words, the amount of time it takes the burst 462 from UT 112B to reach the SAT 102A from the time the SAT 102A transmits the Tx radio frame 412A can include the propagation delay 446 of the Tx radio frame 412A from the SAT 102A to the UT 112B, the processing delay 442, the transition delay 444, the propagation delay 446 for the burst 462 from the UT 112B to the SAT 102A, and the synchronization delay 448. As illustrated in FIG. 4, this amount of time, which is consistent with the DL/UL offset 450, can ensure that the burst 462 from the UT 112B reaches the SAT 102A within the same radio frame (e.g., Rx radio frame 412B) as the burst 460 from UT 112A.

By timing their uplink bursts (e.g., 460 and 462) according to, or consistent with, the DL/UL offset 450, the UTs 112A and 112B in group 470A (as well as any other UTs in group 470A) can ensure their uplink bursts reach the SAT 102A within the same radio frame (e.g., 412B), which will allow the SAT 102A to decode the uplink bursts without interference or errors. Moreover, the DL/UL offset 450 along with the number of groups in the grouping scheme implemented (e.g., six groups in the example shown in FIG. 4), can ensure that the timing/delay provided by the DL/UL offset 450 does not lead to overlapping operations (e.g., receive, process, transmit) at UTs in the group 470A. Thus, by keeping their downlink and uplink transmissions synchronized or consistent with the DL/UL offset 450, the SAT 102A and the UTs in the group 470A (including UTs 112A and 112B) can ensure that receive, process, and transmit operations at the UTs do not overlap in time. Accordingly, a DL/UL offset along with a specific grouping factor (e.g., a correct and/or accurate grouping factor) used in the grouping scheme can prevent overlapping receive, process, and transmit operations at UTs.

The SAT 102A and the UTs in the other groups 470B-F can similarly synchronize and/or time their downlink and uplink transmissions according to the DL/UL offset 450 to ensure uplink bursts from UTs in a same group reach the SAT 102A within a same radio frame, and to prevent receive, process, and/or transmit operations at a UT from overlapping in time. For example, the UTs in groups 470B-F can use the DL/UL offset 450 to time their uplink bursts to arrive at SAT 102A within Rx radio frames 414B-422B, respectively, and the SAT 102A can time downlink transmissions to the UTs in groups 470B-F based on the DL/UL offset 450 to ensure that receive, process, and/or transmit operations at any UT in groups 470B-F do not overlap in time.

In some examples, the SAT 102A can calculate the DL/UL offset 450 and have it available for determining timing information. Moreover, the SAT 102A can provide the DL/UL offset 450 to the UTs (e.g., via UL-MAP 410) so the UTs can use the DL/UL offset 450 to calculate timing information. Given the DL/UL offset 450, the time of reception of the UL-MAP (and/or a transmission associated with the UL-MAP), the SAT 102A ephemeris (e.g., velocity and position), the UT ephemeris, and the time within a particular radio frame to transmit (e.g., the grant), a UT can calculate the exact time to schedule the uplink burst (e.g., 460, 462) to the SAT 102A and the SAT 102A can calculate the exact time it expects to receive the uplink burst. This way, the SAT 102A and the UTs in each group 470A-F can time and schedule downlink and uplink transmissions in a coordinated and/or synchronized manner that allows uplink transmissions from a same group to arrive at the SAT within a same radio frame and receive, process, and transmit operations at each UT to be sufficiently staggered in time to avoid overlapping receive, process, and/or transmit operations at any UT.

As previously noted, in addition to ensuring that uplink bursts from UTs in a group arrive at the SAT 102A within a same radio frame and preventing receive, process, and/or transmit operations at any UT in groups 470B-F from overlapping in time, the grouping 400 and the timing scheme based on the DL/UL offset 450 can increase the efficiency of bandwidth usage across the groups 470A-F (and the UTs in the groups 470A-F) and reduce communication latencies across the UTs in the groups 470A-F. Moreover, the use of groups 470A-F to coordinate communications and allocate radio frames can limit and/or reduce the wasteful and/or inefficient delays/latencies between receive, process, and transmit operations otherwise experienced by half-duplex UTs when a grouping scheme as described herein is not implemented.

For example, without a grouping scheme, all UTs in the one or more cells served by the SAT 102A would receive downlink transmissions at a same time interval (e.g., a same radio frame window), process transmissions at a same time interval (e.g., a same radio frame window) that is separate from the time interval (e.g., radio frame window) for receiving downlink transmissions, and transmit uplink bursts at a same time interval (e.g., a same radio frame window) that is separate from the time intervals (e.g., radio frame windows) for receiving downlink transmissions and processing data. This would result in significant latencies and inefficiencies as all UTs would share the same bandwidth to transmit data, UTs with lower propagation would be delayed by UTs with higher propagation delays, and the UTs would be unable to perform different operations concurrently or in parallel to decrease latencies and increase efficiencies.

Thus, the grouping 400 would eliminate or alleviate such inefficiencies and provide a better overall performance for the UTs in the one or more cells served by the SAT 102A. However, in some cases, reducing the number of groups implemented for the UTs can provide further performance improvements by increasing bandwidth efficiency and data throughput for the UTs in the groups, and further reducing the amount of delays or latencies experienced by UTs in round-trip communications. For example, as previously explained, the use of six groups in the illustrative example in FIG. 4 can provide each group one sixth (⅙) of the total bandwidth available, and allows some groups to receive data, while other groups process data and other groups transmit data.

However, as further described below with respect to FIG. 5A, a reduction in the number of groups to three groups of UTs can provide additional performance benefits. For example, in an implementation of three groups of UTs, each group can utilize one third (⅓) of the total bandwidth available, as opposed to the one sixth of the total bandwidth available used by each group in the example implementation of six groups of UTs. Moreover, in the example implementation of three groups of UTs, the three groups of UTs can perform different receive, process, and transmit operations at all times without any groups waiting idly during an entire time interval or radio frame and/or without any groups being able to receive, process, or transmit data for an entire time interval or radio frame.

Figure 5A:
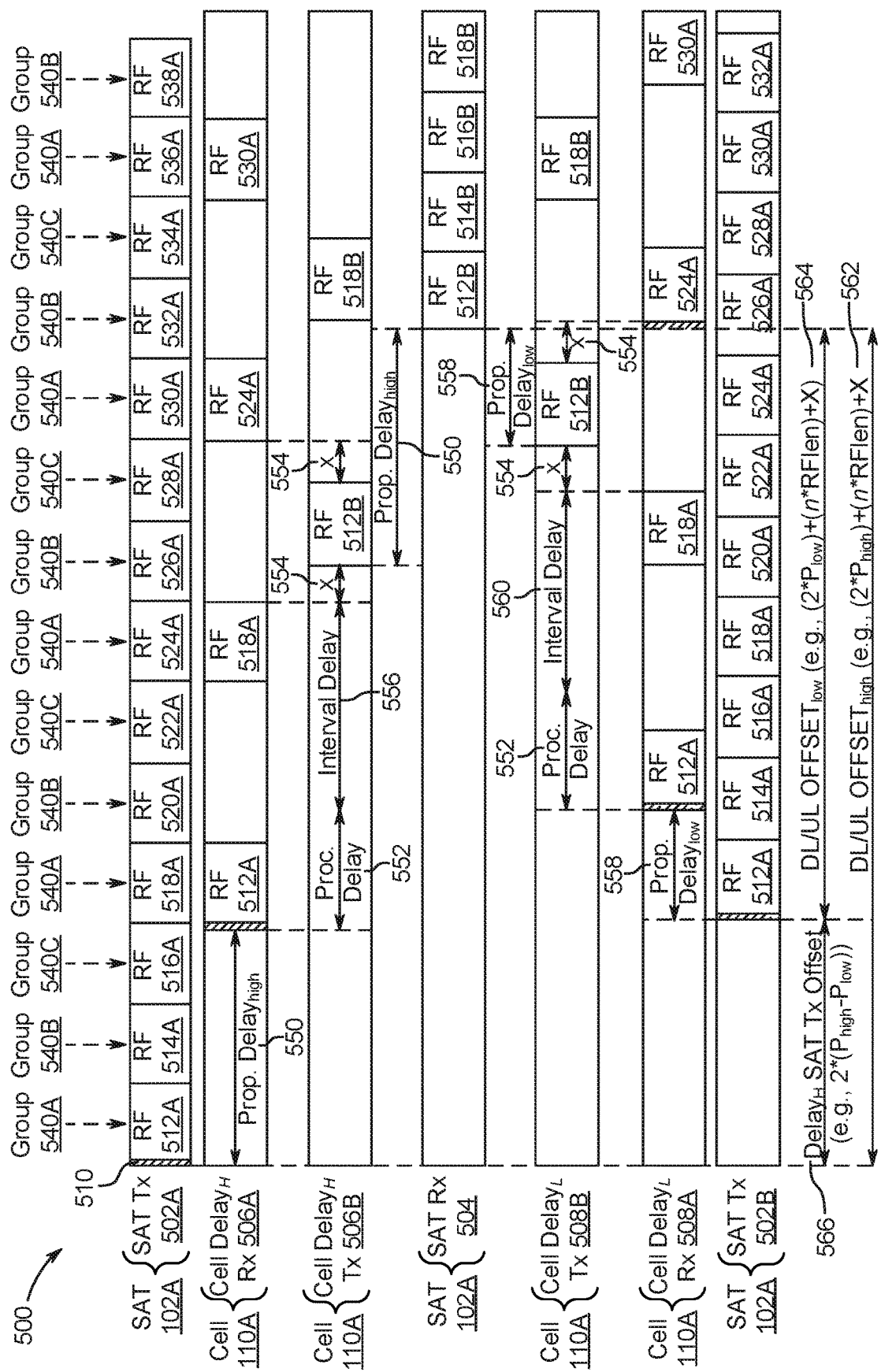
FIG. 5A is a diagram illustrating an example variable timing scheme for timing and/or coordinating receive, process, and transmit operations across groups of user terminals, in accordance with some examples of the present disclosure.

FIG. 5A is a diagram illustrating an example variable timing scheme 500 for timing and/or coordinating receive, process, and transmit operations across groups of UTs. In this example, the variable timing scheme 500 is shown from the perspective of the SAT 102A.

The variable timing scheme 500 can prevent overlapping receive, process, and/or transmit operations at any UT and ensure that uplink transmissions (e.g., bursts) from UTs in a same group are received at the SAT 102A within a same radio frame to avoid interference and ensure that the SAT 102A can properly decode the uplink transmissions. In addition, the variable timing scheme 500 can increase bandwidth and efficiency across all UTs served by the SAT 102A. For example, the variable timing scheme 500 can allow the number of groups of UTs (e.g., groups 540A-C) to be reduced without causing synchronization problems for transmissions to/from UTs or overlapping receive, process, and/or transmit operations at any UTs.

In the illustrative example shown in FIG. 5A, the variable timing scheme 500 implements a variable SAT Tx timing (e.g., SAT Tx timing 502A and 502B) relative to the SAT Rx timing (e.g., SAT Rx timing 504), and the number of groups of UTs have been reduced to three (3) groups of UTs, including groups 540A-C. For example, the SAT 102A can vary the SAT Tx timing for transmitting downlink radio frames to the groups 540A-C of UTs during a satellite pass while keeping constant the SAT Rx timing for receiving uplink transmissions from the groups 540A-C of UTs.

In other examples, the SAT 102A can vary the SAT Rx timing rather than the SAT Tx timing. However, for illustration purposes, the variable timing scheme 500 is described herein as having variable Tx timing. One of skill in the art will understand that, in some cases, the SAT Rx and/or Tx timing can be varied for a number of reasons (e.g., preferences, propagation constraints, UT constraints, SAT constraints, implementation constraints, among other conditions and/or factors.

As previously noted, varying the SAT Tx timing can allow the number of groups implemented to be reduced, which can then result in higher bandwidth available per group. For example, in some cases, at any given point during a satellite pass, the variable timing scheme 500 can support a range of propagation delays to a UT. In some examples, the variable SAT Tx timing can allow the number of groups supported without causing overlapping receive, process, and/or transmit operations at a UT because, rather than delaying all UTs with lower propagation delays according to a maximum propagation delay as in the grouping scheme 400, the variable timing scheme 500 can re-calculate the DL/UL offset used to time and schedule transmissions at each radio frame to dynamically and more precisely/granularly vary DL/UL offsets tailored to support a range of propagation delays for specific radio frames (and/or satellite passes).

As illustrated in the variable timing scheme 500 in FIG. 5A, the SAT 102A can calculate a first SAT Tx timing 502A for UTs within a cell 110A based on a propagation delay from the SAT 102A to a certain point(s)/location(s) within the cell 110A, such as a center of the cell 110A, at a specific time (e.g., a satellite pass). The SAT 102A can then calculate a second SAT Tx timing 502B for UTs within the cell 110A at a different time (e.g., a different pass) when the propagation delay from the SAT 102A to the point(s)/location(s) within the cell 110A is different/changes. For example, the SAT 102A can calculate the first SAT Tx timing 502A at/for a specific time when there is a higher propagation delay 550 from the SAT 102A to a center (or any other point/location) of the cell 110A, and the second SAT Tx timing 502B at/for a different time when there is a lower propagation delay 558 from the SAT 102A to a center (or any other point/location) of the cell 110A.

In FIG. 5A, the first SAT Tx timing 502A shows a sequence of Tx radio frames 512A-538A corresponding to the groups 540A-C of UTs within the cell 110A, and the second SAT Tx timing 502B shows a sequence of Tx radio frames 512A-532A for a different time and similarly corresponding to the groups 540A-C of UTs within the cell 110A. The first SAT Tx timing 502A, the cell Rx timing sequence 506A, and the cell Tx timing sequence 506B correspond to a time when there is a higher propagation delay 550 from the SAT 102A to a certain point/location within the cell 110A, and the second SAT Tx timing 502B, the cell Rx timing sequence 508A, and the cell Tx timing sequence 508B correspond to a different time when there is a lower propagation delay 558 from the SAT 102A to the point/location within the cell 110A.

In some examples, the propagation delays (e.g., 550, 558) can be instantaneous propagation delays measured from the SAT 102A to the center of the cell 110A. However, as previously noted, in other examples, the propagation delays (e.g., 550, 558) can be measured from the SAT 102A to one or more other locations/points of, from, and/or within the cell 110A.

To avoid overlapping receive, process, and/or transmit operations at any UTs, the SAT 102A can vary the SAT Tx timing for communications to UTs in a group (e.g., group 540A) depending on the propagation delay between the SAT 102A and a point/location within the cell 110A at a time associated with the communications to the UTs in the group. For example, the SAT 102A can implement the SAT Tx timing 502A for Tx radio frame 512A to group 540A when there is a higher propagation delay 550 from the SAT 102A to a point/location of the cell 110A. The SAT Tx timing 502A implemented during the higher propagation delay 550 can be calculated to ensure that receive, process, and/or transmit operations at the UTs in group 540A do not overlap. When implementing the SAT Tx timing 502A, the UTs in group 540A can also implement an associated DL/UL offset 562 to time their uplink transmissions to the SAT 102A. The DL/UL offset 562 can ensure that the uplink transmissions from the UTs in group 540A arrive at the SAT 102A within the same radio frame (e.g., uplink radio frame 512B in SAT Rx timing 504).

In other instances, when there is a lower propagation delay 558 from the SAT 102A to the point/location of the cell 110A, the SAT 102A can vary the SAT Tx timing. For example, the SAT 102A can implement SAT Tx timing 502B for Tx radio frame 512A to group 540A. The SAT Tx timing 502B can vary the SAT Tx timing by a SAT Tx offset 566 that delays the Tx radio frame 512A to the UTs in group 540A, to prevent overlapping operations at those UTs as further described below with respect to FIG. 5C. After receiving the Tx radio frame 512A transmitted by the SAT 102A to the UTs in group 540A based on the SAT Tx timing 502B, the UTs in group 540A can use the DL/UL offset 564 to time their uplink transmissions to the SAT 102A, to ensure their uplink transmissions arrive at the SAT 102A within a same radio frame (e.g., uplink radio frame 512B in the SAT Rx timing 504). The variable timing scheme 500 can thus prevent overlapping receive, process, and/or transmit operations at UTs as well as misaligned uplink radio frames at the SAT 102A, as described below with respect to FIG. 5B.

The SAT Tx offset 566 can provide an additional delay that can account for the lower propagation delay 558 experienced when the SAT Tx timing 502B is implemented. In some examples, the SAT Tx offset 566 can be calculated by multiplying the difference between the higher (or maximum) propagation delay (e.g., 550) and the lower (or minimum) propagation delay (e.g., 558) by two (2), which provides alignment of transmissions and prevents overlapping receive, process, and/or transmit operations during periods associated with the lower propagation delay 558 and the higher propagation delay 550.

As illustrated in the cell Rx timing sequence 506A, when the SAT 102A implements SAT Tx timing 502A, the UTs in group 540A will receive the Tx radio frame 512A from the SAT 102A after the higher propagation delay 550. On the other hand, as illustrated in cell Rx timing sequence 508A, when the SAT 102A implements the SAT Tx timing 502B, the UTs in group 540A will receive the Tx radio frame 512A from the SAT 102A after the lower propagation delay 558 and the SAT Tx offset 566 used for the cell RX timing sequence 508A. Moreover, during the SAT Tx timing 502A, the UTs in group 540A will use the DL/UL offset 562 to time their uplink transmissions to the SAT 102A, and during the SAT Tx timing 502B the UTs in group 540 will use the DL/UL offset 564 to time their uplink transmissions to the SAT 102A. Further, the SAT Tx timing 502A and the SAT Tx timing 502B in this example are varied relative to the SAT Rx timing 504.

At the cell Tx timing sequence 506B associated with the SAT Tx timing 502A corresponding to the higher propagation delay 550, the time for uplink bursts from UTs in the group 540A to reach the SAT 102A within an uplink radio frame 512B in the SAT Rx timing 504 (e.g., from the time the Tx radio frame 512A is transmitted by the SAT 102A) can correspond to the sum of the higher propagation delay 550 for receiving the Tx radio frame 512A from the SAT 102A, the processing delay 552 for processing the Tx radio frame 512A and preparing the uplink burst, an interval delay 556 that provides a delay until a next interval for transmitting data after the Tx radio frame 518A from the SAT 102A, a transition interval 554 for performing a hardware switch from receive mode to transmit mode, and the higher propagation delay 550 for the uplink burst to reach the SAT 102A after being transmitted. This timing is consistent with the DL/UL offset 562 calculated for the UTs when implementing the SAT Tx timing 502A associated with the higher propagation delay 550, which the UTs can use to time their uplink bursts so they reach the SAT 102A within the uplink radio frame 512B.

Similarly, at the cell Tx timing sequence 508B associated with the SAT Tx timing 502B corresponding to the lower propagation delay 558, the time for uplink bursts from UTs in the group 540A to reach the SAT 102A within an uplink/Rx radio frame 512B in the SAT Rx timing 504 (e.g., from the time the Tx radio frame 512A is transmitted by the SAT 102A) can correspond to the sum of the lower propagation delay 558 for receiving the Tx radio frame 512A from the SAT 102A, the processing delay 552, an interval delay 560 that similarly provides a delay until a next interval for transmitting data after the Tx radio frame 518A from the SAT 102A, a transition interval 554 for performing a hardware switch from receive mode to transmit mode, and the lower propagation delay 558 for the uplink burst to reach the SAT 102A after being transmitted. This timing is consistent with the DL/UL offset 564 calculated for the UTs when implementing the SAT Tx timing 502B associated with the lower propagation delay 558, which the UTs can use to time their uplink bursts so they reach the SAT 102A within the uplink/Rx radio frame 512B in the SAT Rx sequence 504.

As previously noted, the UTs in group 540A can receive the DL/UL offset (e.g., DL/UL offsets 562 and 564) to use from the SAT 102A (e.g., via UL-MAP 510 in Tx radio frame 512A). The UTs in group 540A can use the corresponding DL/UL offset (e.g., DL/UL offset 562 when SAT Tx timing 502A is used and DL/UL offset 564 when SAT Tx timing 502B is used), and use the DL/UL offset to schedule, and/or determine when to transmit, any uplink burst to the SAT 102A so the uplink burst(s) is aligned within the uplink radio frame 512B in the SAT Rx timing 504 when received by the SAT 102A. For example, when the SAT Tx timing 502A is implemented, the UTs can use the DL/UL offset 562 to schedule, and/or determine when to transmit, any uplink burst to the SAT 102A, and when the SAT Tx timing 502B is implemented, the UTs can use the DL/UL offset 564 to schedule, and/or determine when to transmit, any uplink burst to the SAT 102A.

Figure 5B:
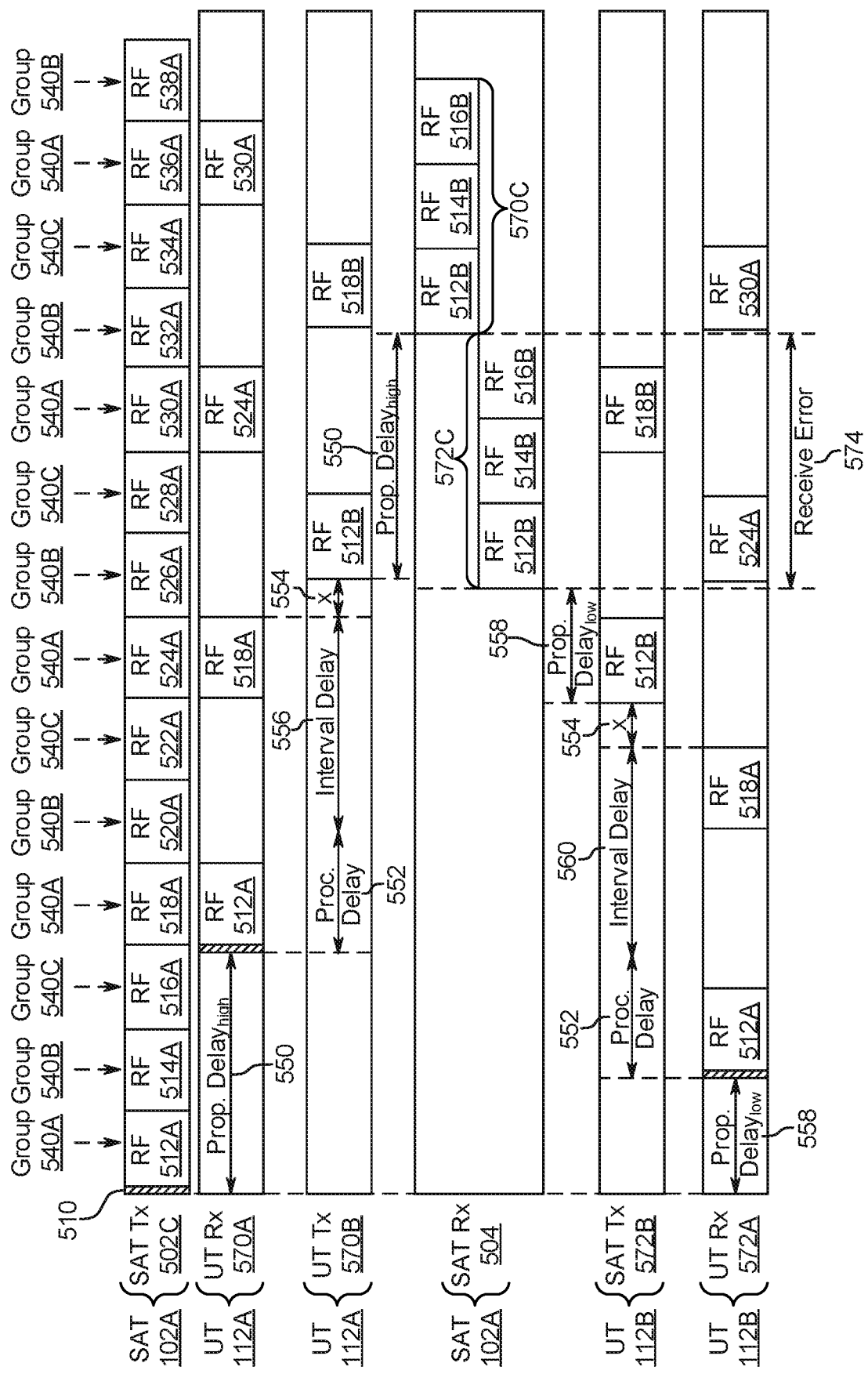
FIG. 5B is a diagram illustrating a satellite receive error caused by a misalignment of uplink radio frames when a certain grouping of user terminals is implemented without a variable timing scheme, in accordance with some examples of the present disclosure.
Figure 5C:
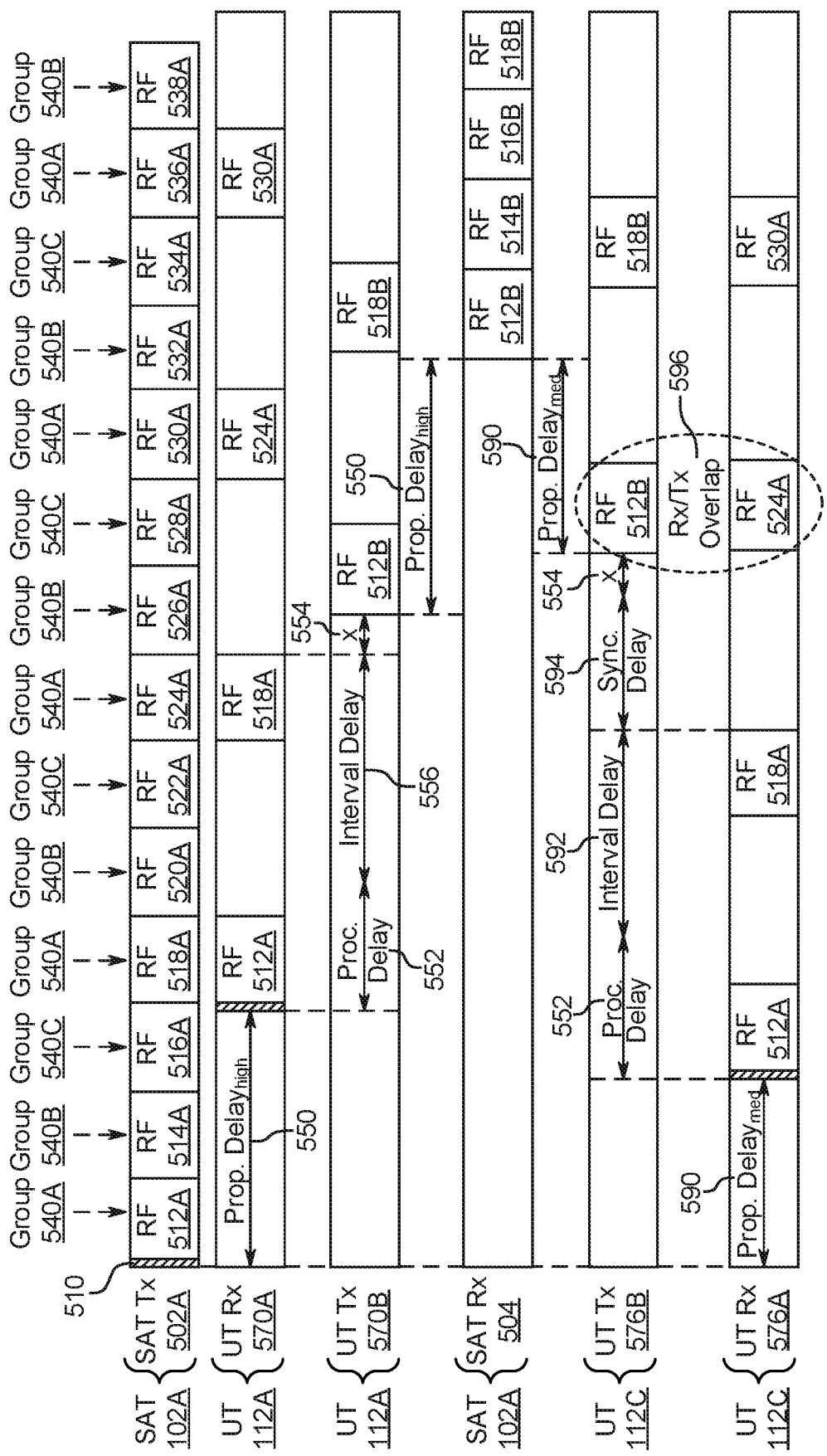
FIG. 5C is a diagram illustrating an overlap of receive and transmit radio frames when a certain grouping of user terminals is implemented without a variable timing scheme, in accordance with some examples of the present disclosure.

The DL/UL offsets 562 and 564 can ensure that transmit, process, or receive operations at the UTs do not overlap at any of the UTs when the SAT Tx timing 502A or the SAT Tx timing 502B is implemented, as shown in FIG. 5C. In some cases, the interval delay 556 in the cell Tx timing sequence 506B can be calculated by determining the delay between the end of the processing delay 552 and the end of the Tx radio frame 518A, and the interval delay 560 in the cell Tx timing sequence 508B can similarly be calculated by determining the delay between the end of the processing delay 552 and the end of the Tx radio frame 518A. In other cases, the interval delay 556 can be calculated by subtracting the higher propagation delay 550 for the Tx radio frame 512A, the processing delay 552, the transition interval 554, and the higher propagation delay 550 for the uplink burst from the DL/UL offset 562 associated with the higher propagation delay 550, and the interval delay 560 can be calculated by subtracting the lower propagation delay 558 for the Tx radio frame 512A, the processing delay 552, the transition interval 554, and the lower propagation delay 558 for the uplink burst from the DL/UL offset 564 associated with the lower propagation delay 558.

Moreover, it should be noted that, in some examples, after the processing delay 552, the UTs in the cell Tx timing sequences 506B and 508B can transition to transmit mode and immediately transmit the uplink burst without implementing the interval delay 556 or 560, respectively. In other words, the UTs can transmit their uplink burst(s) prior to receiving the Tx radio frame 518A from the SAT 102A, in which case the UTs would not apply the interval delay 556 or 560. In examples where UTs do not apply the interval delays (e.g., 556 and 560), the uplink/Rx radio frame 512B shown in the cell Tx timing sequence 506B, the SAT Rx sequence 504, and the cell Tx timing sequence 508B would be shifted a number of radio frames earlier within those sequences so the uplink/Rx radio frame 512B is transmitted by the UTs before receiving the Tx radio frame 518A and the uplink/Rx radio frame 512B in the SAT Rx timing 504 is received by the SAT 102A after the corresponding propagation delay (e.g., 550, 558). Moreover, when the interval delays are not used, the DL/UL offsets 562 and 564 and the parameters used to calculate the DL/UL offsets 562 and 564 would change, as further described below.

After transmitting their uplink bursts, the UTs can transition to receive mode, as illustrated by the transition interval 554 after the uplink/Rx radio frame 512B, so the UTs are ready to receive the upcoming Tx radio frame 524A from the SAT 102A. Moreover, when the uplink bursts from the UTs reach the SAT 102A, the uplink bursts are aligned in time with the uplink/Rx radio frame 512B at the SAT Rx sequence 504. As shown, during the SAT Tx timing 502A, the uplink bursts from the UTs arrive at the SAT 102A according to the DL/UL offset 562, and during the SAT Tx timing 502B, the uplink bursts from the UTs arrive at the SAT 102A according to the DL/UL offset 564.

In some examples, the DL/UL offset 562 can be calculated by multiplying the higher propagation delay 550 times two to get the round-trip propagation delay for the downlink and uplink paths associated with the higher propagation delay, and adding the round-trip propagation delay, the transition interval 554, and the result of multiplying the length of a radio frame (RFlen) by n, where n represents a number of radio frames for delaying the UT Tx timing and extending the DL/UL offset 562. Similarly, in some examples, the DL/UL offset 564 can be calculated by multiplying the lower propagation delay 558 times two to get the round-trip propagation delay for the downlink and uplink paths associated with the lower propagation delay, and adding the round-trip propagation delay, the transition interval 554, and the result of multiplying the length of a radio frame (RFlen) by n.

In FIG. 5A, the number of radio frames n is four, so the length of a radio frame is multiplied by four to yield four radio frames. The four radio frames in this example is used for overlap scheduling to delay uplink bursts until after the Tx radio frame 518A is received at the UTs, to prevent an overlap between transmitting the uplink bursts and receiving the Tx radio frame 518A at the UTs. This delay based on the four radio frames also accounts for the processing delay 552 and the interval delay (e.g., 556 or 560). However, the number of radio frames in FIG. 5A is merely an illustrative example provided for explanation purposes. It should be noted that, in other examples, the number of frames used to calculate the DL/UL offsets 562 and 564 can be more or less than four.

For example, in cases where the UTs transmit uplink bursts after receiving the Tx radio frame 512A but before receiving the Tx radio frame 518A, the number of radio frames n used to calculate the DL/UL offsets 562 and 564 can be one, such that the time for transmitting the uplink bursts at the UTs is delayed by one radio frame as opposed to four radio frames to allow the UTs to transmit uplink bursts before receiving the Tx radio frame 518A. Changing the number of radio frames used to calculate the DL/UL offsets 562 and 564 can also affect the interval delays 556 and 560. To illustrate, changing the number of frames used to calculate the DL/UL offsets 562 and 564 from four to one as described above can remove or reduce the interval delays 556 and 560.

The variable timing scheme 500 described herein can be similarly implemented for transmissions associated with other UTs in groups 540B and 540C. However, for simplicity and illustrative purposes, the variable timing scheme 500 as applied to transmissions associated with UTs in groups 540B and 540C is not shown in FIG. 5A.

FIG. 5B is a diagram illustrating a SAT receive error 574 caused by a misalignment of uplink radio frames if the grouping of user terminals in FIG. 5A is implemented without the variable timing scheme 500 described above with respect to FIG. 5A. In particular, the UTs in cell 110A served by the SAT 102A are divided into the three groups 540A-C, but Rx and Tx transmissions are scheduled according to a fixed Tx timing as opposed to the variable Tx timing described in FIG. 5A. For example, as shown in UT Rx sequences 570A and 572A, UTs 112A and 112B have different propagation delays, with UT 112A having the higher propagation delay 550 and UT 112B having the lower propagation delay 558. However, the SAT Tx timing 502C is the same for both UT 112A and UT 112B.

In other words, the SAT 102A in this example does not implement the variable SAT Tx timing 502B from FIG. 5A for UT 112B despite the different propagation delays 550 and 558, and instead implements a fixed SAT Tx timing 502C (e.g., relative to the SAT Rx timing 504) for both the UT Rx sequence 570A (and UT 112A) and the UT Rx sequence 572A (and UT 112B). As a result, the uplink radio frames (e.g., 512B, 514B, and 516B) from the UT 112A and the UT 112B are misaligned when received by the SAT 102A, as illustrated in the SAT Rx timing 504. The misalignment in the time of arrival of uplink radio frames from the UTs 112A and 112B in group 540A can cause a receive error 574 at the SAT 102A, which can result in interference and/or decoding errors at the SAT 102A.

For example, in the UT Tx sequence 570B associated with UT 112A, the UT 112A receives the Tx radio frame 512A after the higher propagation delay 550 from the time of transmission at the SAT 102A. The uplink radio frame 512B from UT 112A will arrive at the SAT 102A after (relative to the higher propagation delay 550) the processing delay 552, the interval delay 556, the transition interval 554, and the higher propagation delay 550 for the uplink path. The uplink radio frames 514B and 516B from the UT 112A are received by the SAT 102A subsequent to the uplink radio frame 512B. In the UT Tx sequence 572B associated with UT 112B, the UT 112B receives the Tx radio frame 512A after the lower propagation delay 558, and the uplink radio frame 512B from UT 112B will arrive at the SAT 102A after (relative to the lower propagation delay 558) the processing delay 552, the interval delay 560, the transition interval 554, and the lower propagation delay 558 for the uplink path. The uplink radio frames 514B and 516B from the UT 112B will be similarly received by the SAT 102A subsequent to the uplink radio frame 512B.

As illustrated in the SAT Rx timing 504, the UT time-of-arrival (TOA) 570C of the uplink radio frames 512B, 514B, 516B from the UT 112A is after the UT TOA 572C of the uplink radio frames 512B, 514B, 516B from the UT 112B, and the radio frames 512B, 514B, 516B within the UT TOA 570C are not aligned with the radio frames 512B, 514B, 516B within the UT TOA 572C. More specifically, the uplink radio frames 512B from UT 112A and UT 112B are not aligned within a same radio frame at the SAT 102A, the uplink radio frames 514B from UT 112A and UT 112B are not aligned within a same radio frame at the SAT 102A, and the uplink radio frames 516B from UT 112A and UT 112B are also not aligned within a same radio frame at the SAT 102A. Such misalignment in the uplink radio frames 512B, 514B, 516C can cause the receive error 574 at the SAT 102A, as previously explained, which can be avoided by the variable timing scheme 500 from FIG. 5A.

The receive error 574 and misalignments described herein can be similarly encountered for other UTs in group 540A and UTs in groups 540B and 540C when fixed SAT Tx timing is implemented for the groups 540A-C. However, for simplicity and illustrative purposes, the receive error 574 and misalignments are only shown in FIG. 5B and described herein with respect to UTs 112A and 112B in group 540A.

With reference to FIG. 5C, the fixed SAT Tx timing described in FIG. 5B with respect to groups 540A-C can also cause overlapping Tx and Rx operations at a UT. UT Rx 576A and UT Tx 576B show the Rx and Tx timing sequences for UT 112C in group 540A. Here, UT 112C has a medium propagation delay 590, which can be a smaller delay than the higher propagation delay 550 but a bigger delay than the lower propagation delay 558.

At the UT Rx sequence 576A, UT 112C can receive the Tx radio frame 512A after the medium propagation delay 590. At the UT Tx sequence 576B, to transmit the uplink radio frame 512B after receiving the Tx radio frame 512A, the UT 112C processes the Tx radio frame 512A and prepares the uplink radio frame during the processing delay 552. To avoid overlapping between a transmission of the uplink radio frame and receiving the Tx radio frame 518A, the UT 112C delays the uplink transmission according to the interval delay 592. The interval delay 592 can delay the uplink transmission to the next interval, which in this example starts after the Tx radio frame 518A.

To ensure the uplink radio frame 512B from UT 112C arrives at the SAT 102A within the same radio frame as the uplink radio frame 512B from UT 112A, the UT 112C can implement a synchronization delay 594. In some examples, the synchronization delay 594 can correspond to a round-trip delay difference between the UT 112A and the UT 112C (e.g., (2*higher propagation delay 550)−(2*medium propagation delay 590)) and the differences (if any) between the interval delay 556 and the interval delay 592.

However, while the synchronization delay 594 can delay the transmission of the uplink radio frame 512B at the UT 112C to ensure the uplink radio frame 512B from UT 112C arrives at the SAT 102A within a same radio frame as the uplink radio frame 512B from UT 112A for proper alignment, the synchronization delay 594 can also cause a Tx/Rx overlap 596 between the transmission of the uplink radio frame 512B and the Tx radio frame 524A received from the SAT 102A. Since the UT 112C in this example is half-duplex, the overlap between the uplink radio frame 512B and the Tx radio frame 524A can cause a communication failure, as the UT 112C cannot receive and transmit data at the same time or within the same time window.

If the UT 112C were to forego the synchronization delay 594 and transmit the uplink radio frame 512B without implementing the synchronization delay 594, the UT 112C may be able to avoid the overlap between the uplink radio frame 512B and the Tx radio frame 524A. However, without the synchronization delay 594, the uplink radio frame 512B from the UT 112C will not arrive at the SAT 102A within a same radio frame as the uplink radio frame 512B from the UT 112A. Instead, the uplink radio frame 512B from UT 112C will arrive at the SAT 102A before the uplink radio frame 512B from the UT 112A, and the uplink radio frames 512B from the UTs 112A and 112C will be misaligned at the SAT 102A, causing a receive error as illustrated in FIG. 5B. Such Tx/Rx overlap 596 and misalignment at the SAT 102A can be prevented for groups 540A-C by implementing the variable timing scheme 500 described in FIG. 5A.

The Tx/Rx overlap 596 described herein can be similarly encountered for other radio frames, other UTs in group 540A, and/or UTs in groups 540B and 540C when fixed SAT Tx timing is implemented for the groups 540A-C. However, for simplicity and illustrative purposes, the Tx/Rx overlap 596 are only shown in FIG. 5C and described herein with respect to UT 112C in group 540A.

Figure 6:
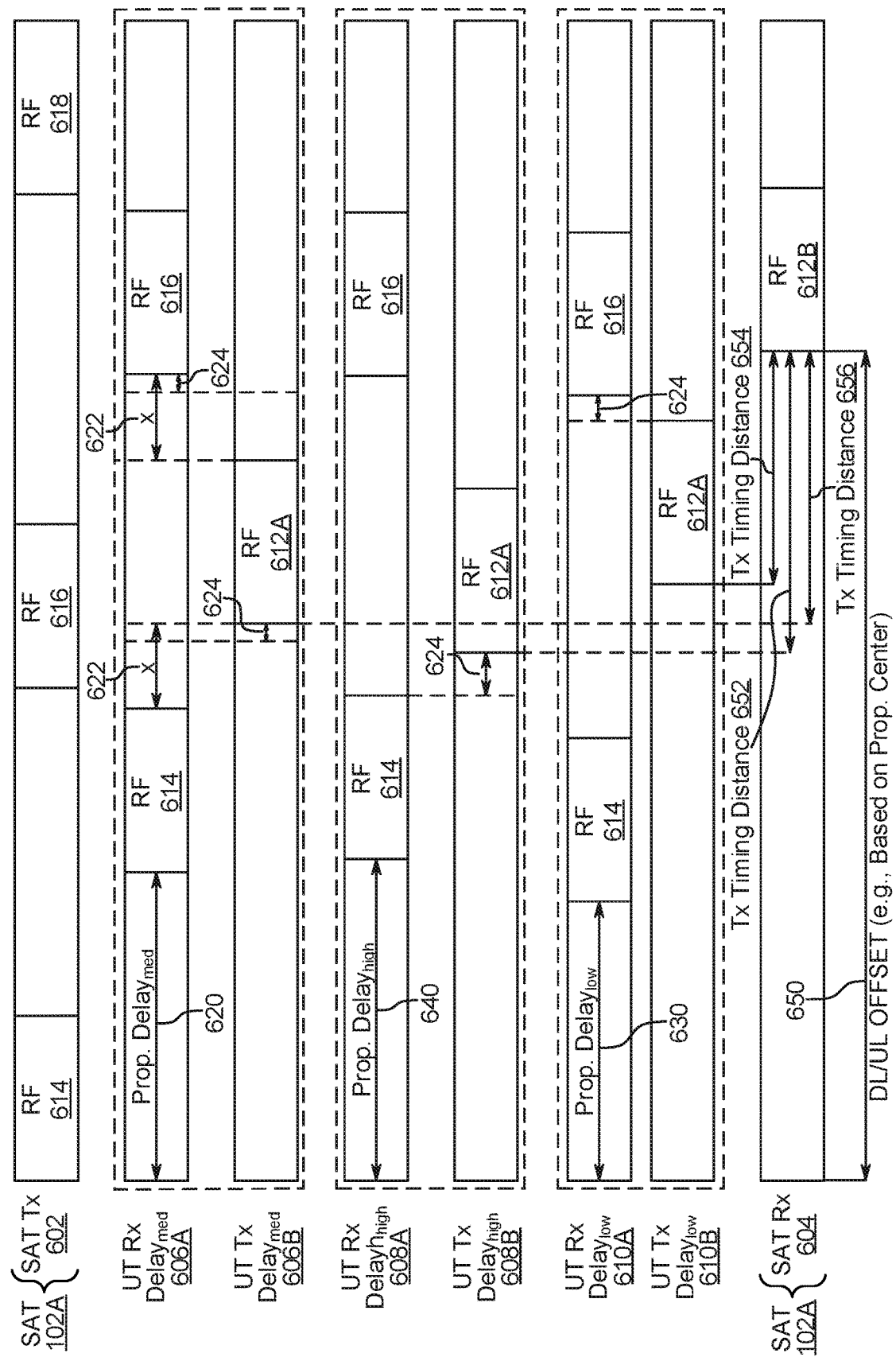
FIG. 6 is a diagram illustrating an example variable timing scheme from the perspective of user terminals, in accordance with some examples of the present disclosure.

FIG. 6 is a diagram illustrating the example variable timing scheme (e.g., 500) from FIG. from the perspective of UTs. Here, the SAT Tx sequence 602 illustrates a sequence of Tx radio frames 614, 616, and 618, and the SAT Rx sequence 604 illustrates a timing of an uplink radio frame 612B from UTs. The uplink radio frame 612B can correspond to a downlink radio frame (e.g., a Tx radio frame) transmitted by the SAT 102A to the UTs before the Tx radio frame 614.

The UT Rx delay sequence 606A can include a sequence of Tx radio frames received from the SAT 102A by UTs having a medium propagation delay 620. In this example, the UTs in the UT Rx delay sequence 606A can receive the Tx radio frame 614 after the medium propagation delay 620. At the UT Tx delay sequence 606B, the UTs can transmit the uplink radio frame 612A after a transition delay 622 from the end of the Tx radio frame 614. The transition delay 622 can include, for example and without limitation, a delay for switching from receive mode to transmit mode, a processing delay, and/or an alignment delay 624 for aligning the uplink radio frame 612A centrally between prior and subsequent radio frames (e.g., centrally between Tx radio frames 614 and 616). In other examples, the transition delay 622 can include other delays or exclude the processing delay and/or the alignment delay 624.

The uplink radio frame 612A from the UTs in the UT Tx delay sequence 606B can arrive at the SAT 102A after or at the DL/UL offset 650. In some examples, the DL/UL offset 650 can be calculated based on, or relative to, the medium propagation delay 620. In some cases, propagation delays of UTs can be based on their relative proximity to a center of the cell (e.g., 110A) and the DL/UL offset 650 can be based on the propagation delay(s) calculated from a center location/area of the cell. In other examples, the DL/UL offset 650 can be based on any other propagation delays. Moreover, in some cases, the UTs can time when to transmit the uplink radio frame 612A based on a Tx timing distance 656 from the end of the DL/UL offset 650. In some examples, the Tx timing distance 656 can account for the medium propagation delay 620 associated with the UTs. For example, the Tx timing distance 656 can represent the medium propagation delay 620, and can include an amount of time used to calculate the DL/UL offset 650 to determine a time to transmit the uplink radio frame 612A so it arrives within the uplink radio frame 612B in the SAT Rx sequence 604 at the SAT 102A.

Returning to the UT Rx delay sequence 606A, the UTs can receive the Tx radio frame 616 from the SAT 102A after transmitting the uplink radio frame 612A. For example, the UTs can receive the Tx radio frame 616 after the transition delay 622 from the end of the uplink radio frame 612A. At the UT Rx delay sequence 608A, the UTs associated with the UT Rx delay sequence 608A can receive Tx radio frame 614 after the higher propagation delay 640. At the UT Tx delay sequence 608B, the UTs can transmit uplink radio frame 612A immediately after receiving the Tx radio frame 614 or after the alignment delay 624. In some examples, the UTs can time when to transmit the uplink radio frame 612A based on Tx timing distance 652, which can represent the higher propagation delay 640 and can be used to calculate the DL/UL offset 650 for/by the UTs associated with the higher propagation delay 640.

At UT Rx delay sequence 610A, the UTs associated with the UT Rx delay sequence 610A can receive the Tx radio frame 614 after the lower propagation delay 630. At the UT Rx delay sequence 610B, the UTs can then transmit uplink radio frame 612A after receiving the Tx radio frame 614. The UTs can time when to transmit the uplink radio frame 612A based on Tx timing distance 654, which can represent the lower propagation delay 630 and can be used to calculate the DL/UL offset 650 for/by the UTs associated with the lower propagation delay 630.

As illustrated in the SAT Rx sequence 604, the SAT 102A can receive the uplink radio frame 612B according to the DL/UL offset 650. Moreover, given the different propagation delays between the UTs associated with the UT Rx delay sequence 606A, the UT Rx delay sequence 608A, and the UT Rx delay sequence 610A, the Tx timing distances 652, 654, and 656 used to calculate the DL/UL offset 650 can vary.

Figure 7:
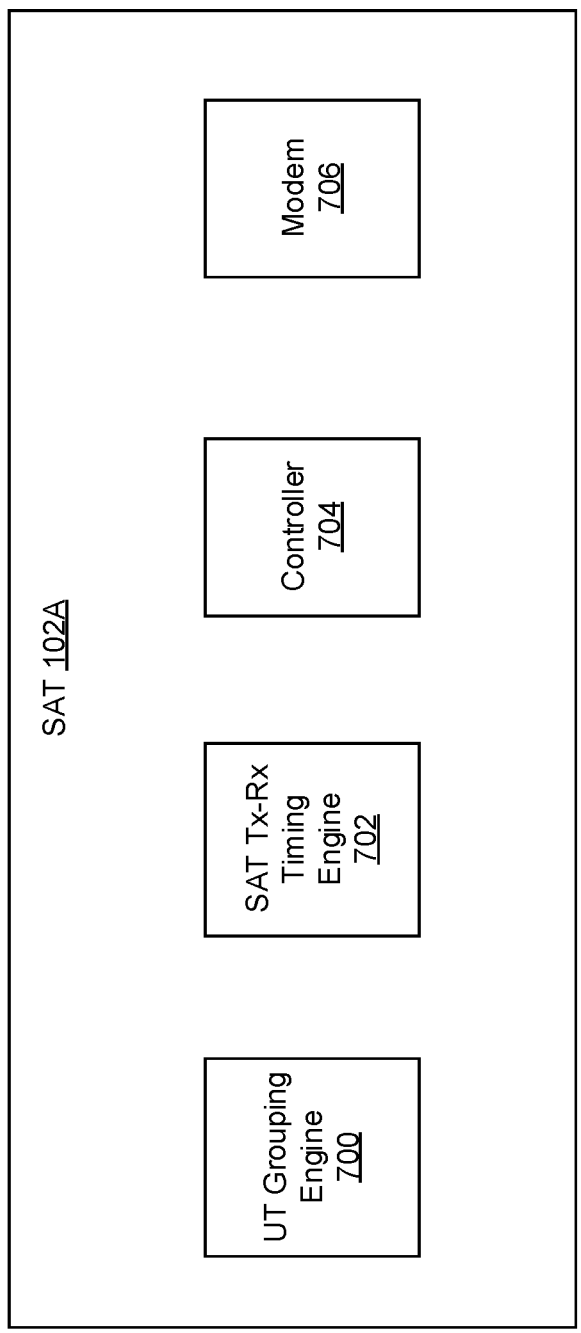
FIG. 7 is a simplified diagram of an example processing architecture implemented by satellite for timing communications with user terminals, in accordance with some examples of the present disclosure.

FIG. 7 is a simplified diagram of an example processing architecture implemented by SAT 102A for timing communications (e.g., downlink and uplink transmissions) with UTs. In this example, the SAT 102A can include a UT grouping engine 700. The UT grouping engine 700 can determine what grouping scheme to implement during any satellite pass. In other words, the UT grouping engine 700 can determine how to divide UTs in one or more cells served by the SAT 102A, including how many groups of UTs to implement, how many UTs to include in each group, and/or how to assign UTs to groups (e.g., randomly, equally, based on bandwidth requirements, based on UT location/proximity, etc.).

To determine what grouping scheme to implement (e.g., how many groups of UTs, etc.), the UT grouping engine 700 can obtain data identifying how many cells the SAT 102A is serving using a single beam, the size of each cell served by the SAT 102A, the number of UTs in each cell served by the SAT 102A, the locations (e.g., geographical coordinates) of each UT served by the SAT 102A, the ephemeris of the SAT 102A, the range of propagation delays of the UTs served by the SAT 102A, and/or any other information. The UT grouping engine 700 can then calculate a grouping scheme based on the number of cells served by the SAT 102A using a single beam, the size of each cell served by the SAT 102A, the number of UTs in each cell served by the SAT 102A, the locations (e.g., geographical coordinates) of each UT served by the SAT 102A, the range of propagation delays of the UTs served by the SAT 102A, and/or the ephemeris of the SAT 102A.

In some examples, the UT grouping engine 700 can calculate a grouping of six groups of UTs, such as grouping 400 illustrated in FIG. 4. The UT grouping engine 700 can implement six groups in various scenarios such as, for example, when the SAT 102A serves multiple cells using a single beam, when the SAT 102A has to serve a certain range of propagation delays, when the SAT 102A has to serve a certain number of UTs, etc. In other examples, the UT grouping engine 700 can implement a grouping of three UT groups as illustrated in FIG. 5A. For example, the UT grouping engine 700 can implement a grouping of three UT groups when the SAT 102A serves a single cell with a beam and/or when the SAT 102A serves a certain range of propagation delays below a threshold.

In other cases, the UT grouping engine 700 can implement other grouping schemes such as, for example, a grouping of four UT groups, a grouping of five UT groups, a grouping of seven UT groups, etc. In some examples, if the SAT 102A serves more than a certain number of cells, such as six cells, the UT grouping engine 700 can implement a number of UT groups that matches the number of cells served by the SAT 102A. For example, if the SAT 102A serves eight, nine, or ten cells, the UT grouping engine 700 can implement eight, nine, or ten UT groups respectively.

In some cases, the UT grouping engine 700 can change and/or adjust the number of UT groups implemented at any particular time. For example, the UT grouping engine 700 can assess the grouping scheme at specific time intervals and/or events, and dynamically change the number of UT groups based on the various factors at that particular time. To illustrate, the UT grouping engine 700 may implement the grouping scheme 400 including six UT groups as illustrated in FIG. 4, and subsequently change the grouping to three UT groups as illustrated in FIG. 5A. The UT grouping engine 700 may switch to three UT groups if it determines that it is capable of supporting the three UT groups without causing misaligned transmissions or overlaps between receive, process, or transmit operations at UTs. If the UT grouping engine 700 later determines that it can no longer support the three UT groups, the UT grouping engine 700 can revert to six groups or any other grouping scheme supported at that particular time.

When grouping UTs, the UT grouping engine 700 can assign each half-duplex UT to a single UT group. In some cases, if there are any full-duplex UTs, the UT grouping engine 700 can include such full-duplex UTs in any or all UT groups. For example, in some cases, the UT grouping engine 700 can include a full-duplex UT in one or more UT groups. In other cases, the UT grouping engine 700 can include a full-duplex UT in all UT groups being implemented.

The SAT Tx-Rx timing engine 702 can use the grouping scheme calculated by the UT grouping engine 700 and calculate a timing scheme to implement for the grouping scheme. For example, the SAT Tx-Rx timing engine 702 can determine to implement a fixed SAT Tx to Rx timing scheme as illustrated in FIG. 4 or a variable timing scheme 500 as illustrated in FIG. 5A. The SAT Tx-Rx timing engine 702 can dynamically set the relative SAT Tx to Rx timing scheme (fixed or variable), and can dynamically update/check the timing scheme at certain intervals and/or events. In some examples, the SAT Tx-Rx timing engine 702 can dynamically check and/or update the timing scheme at high radio frame rates, such as every 1 or 2 milliseconds.

In some cases, the SAT Tx-Rx timing engine 702 can calculate the DL/UL offset value(s) for the UTs based on the grouping and timing scheme being implemented. The SAT 102A can provide the DL/UL offset value(s) to the UTs as previously explained.

The controller 704 can obtain the grouping scheme calculated by the UT grouping engine 700 and the timing scheme calculated by the SAT Tx-Rx timing engine 702 and use that information to implement the grouping and timing scheme at the SAT 102A. In some examples, the controller 704 can control the modem 706 on the SAT 102A to implement the grouping and timing scheme. For example, the controller 704 can instruct the modem 706 to shift the transmit timing, fix the transmit timing, or vary the transmit timing based on the grouping and timing scheme being implemented.

Having disclosed example systems, components and concepts, the disclosure now turns to the example methods 800 and 820 for timing multi-user transmissions, as shown in FIGS. 8A and 8B. The steps outlined herein are non-limiting examples provided for illustration purposes, and can be implemented in any combination thereof, including combinations that exclude, add, or modify certain steps.

At block 802, the method 800 can include receiving, by a user terminal (e.g., 112A) associated with a group of user terminals (e.g., 470A, 540A), a downlink radio frame (e.g., 412A, 512A) transmitted by a satellite (e.g., SAT 102A) to the group of user terminals. In some examples, the user terminal can be a half-duplex user terminal. Moreover, one or more other user terminals in the group of user terminals can similarly be half-duplex terminals.

At block 804, the method 800 can include identifying one or more offset delays (e.g., DL/UL offset 450, 562, 564) defined in the downlink radio frame for scheduling transmissions (e.g., downlink and uplink transmissions) between the satellite and each user terminal in the group of user terminals. In some examples, the one or more offset delays provide non-overlapping time intervals (e.g., radio frames) and frequency intervals for transmit (Tx) operations at each user terminal in the group of user terminals. For example, the one or more offset delays can align Tx operations at each user terminal with/within different radio frame intervals so receive (Rx), process, and Tx operations at a user terminal do not overlap in time.

In some cases, each time and frequency interval from the non-overlapping time and frequency intervals can provide the user terminal time to start and complete a respective Tx operation before starting a next Rx, process, and/or Tx operation. This can ensure that Rx, process, or Tx operations do not overlap in time at the user terminal, as previously explained.

At block 806, the method 800 can include determining, based on the one or more offset delays and a first time when the downlink radio frame was received by the user terminal (e.g., Rx burst detection time), a second time for transmitting an uplink radio burst (e.g., 460, 462, 512B) to the satellite. The uplink radio burst when transmitted at the second time can be estimated to arrive at the satellite within a same radio frame interval (e.g., 412B, 512B) as one or more uplink radio bursts from one or more user terminals (e.g., UT 112B, UT 112C, etc.) in the group of user terminals. In other words, by transmitting the uplink radio burst at the second time, the uplink radio burst can be properly aligned in time (e.g., within a same radio frame) with other uplink radio bursts when the uplink radio burst and the other uplink radio bursts reach the satellite, to avoid interference and allow the satellite to decode the uplink radio bursts.

In some examples, determining the second time for transmitting the uplink radio burst to the satellite can include determining, based on a position of the satellite and a position of the user terminal, a propagation delay (e.g., 440, 446, 550, 558, 590) associated with the downlink radio frame and the uplink radio burst, a processing delay (e.g., 442, 552) including an amount of time for processing the downlink radio frame and preparing the uplink radio burst, and/or a transition delay (e.g., 444, 554) for transitioning the user terminal from a receive mode to a transmit mode, and determining the second time for transmitting the uplink radio burst to the satellite based on the propagation delay associated with the downlink radio frame and the uplink burst, the processing delay, and the transition delay. In some examples, the second time can also be based on, or account for, a synchronization delay (e.g., 448) that accounts for any difference between propagation delay associated with the user terminal and other user terminals, an interval delay (e.g., 556, 560) that provides a delay until a next interval for transmitting data after a subsequent downlink radio frame received from the satellite, and/or an alignment delay (e.g., 624) for aligning the uplink radio burst centrally between prior and subsequent radio frames.

In some cases, determining the second time for transmitting the uplink radio burst can include determining a target time of arrival for the uplink radio burst based on an offset delay from the one or more offset delays and/or a sum of the propagation delay associated with the downlink radio frame and the uplink burst, the processing delay, and the transition delay, and determining the second time for transmitting the uplink radio burst by subtracting the propagation delay associated with the uplink burst from the offset delay or the sum of the propagation delay associated with the downlink radio frame and the uplink burst, the processing delay, and the transition delay. In some cases, the sum can also include a synchronization delay (e.g., 448), an interval delay (e.g., 556, 560), and/or an alignment delay (e.g., 624). Thus, the second time can be determined by subtracting the propagation delay associated with the uplink burst from the offset delay or the sum of the propagation delay associated with the downlink radio frame and the uplink burst, the processing delay, the transition delay and one or more of the synchronization delay, the interval delay, and/or the alignment delay.

In some examples, the target time of arrival can be determined relative to the time the user terminal received the downlink radio frame from the satellite or the time the satellite transmitted the downlink radio frame to the user terminal. For example, the user terminal can receive the downlink radio frame, which can include an indication of the one or more offset delays. The user terminal can use an offset delay from the one or more offset delays to determine the time when the downlink radio frame was transmitted by the satellite, the propagation delay associated with the downlink radio frame and the uplink burst, the processing delay, the transition delay, the synchronization delay, the interval delay, and/or the alignment delay. The user terminal can then add the offset delay to the time when the downlink radio frame was transmitted by the satellite to determine the target time of arrival. The user terminal can also subtract the propagation delay for the uplink radio burst from the target time of arrival to determine the second time for transmitting the uplink radio burst.

Determining the propagation delay associated with the downlink radio frame and the uplink radio burst can include, for example, determining a downlink propagation delay associated with the downlink radio frame and an uplink propagation delay associated with the uplink radio burst. In some cases, the downlink propagation delay and the uplink propagation delay can be determined based at least partly on a velocity of the satellite and a distance between the satellite and the user terminal or a point/location of a cell associated with the user terminal.

At block 808, the method 800 can include transmitting, by the user terminal to the satellite, the uplink radio burst at the second time. In some cases, the user terminal can transition to receive mode after transmitting the uplink radio burst to prepare for receiving another downlink radio frame.

In some examples, the second time and/or the same radio frame interval can at least partly overlap in time with a downlink radio frame (e.g., 414A-434A or 514A-538A) transmitted by the satellite to one or more additional groups of user terminals (e.g., any of groups 470B-470F, any of groups 540B-540C) served by the satellite. The group of user terminals and the one or more additional groups of user terminals can be part of a plurality of groups of user terminals (e.g., 470B-470F or 540B-540C) used to group and rotate downlink and uplink transmissions associated with a plurality of user terminals served by the satellite. For example, the plurality of groups of user terminals can be used to group user terminals served by the satellite and cycle operations (e.g., Rx, process, Tx) and/or transmissions (e.g., Rx, Tx) between the different groups.

To illustrate, operations (e.g., Rx, process, Tx) and/or transmissions (e.g., Rx, Tx) can be cycled between groups of user terminals such that when a first set of groups of user terminals (e.g., one or more groups of user terminals) is receiving a downlink transmission from the satellite, a second set of groups of user terminals (e.g., one or more groups of user terminals) are processing a received downlink transmission, and a third set of groups of user terminals (e.g., one or more groups of user terminals) are transmitting an uplink transmission to the satellite. This can increase user terminal and communication efficiency by preventing all user terminals from simultaneously (or in parallel or significantly contemporaneously) performing the same operation (e.g., receiving, processing, or transmitting data) and thereby wasting two-thirds of the time that at least some of the user terminals could be using to perform other operations (e.g., a different operation(s) from the receiving, processing and transmitting operations).

In some aspects, the method 800 can further include receiving, by the user terminal, a second downlink radio frame transmitted by the satellite to a different group of user terminals, and identifying one or more additional offset delays defined in the second downlink radio frame for scheduling transmissions between the satellite and each user terminal in the different group of user terminals, the one or more additional offset delays providing additional non-overlapping time intervals for receive, process, and transmit operations at each user terminal in the different group of user terminals. The different group of user terminals can include the user terminal and a different number of user terminals than the group of user terminals.

For example, the satellite can continuously assess the groupings implemented and make any changes/updates to the number of groups (and/or the membership of groups) implemented based on one or more factors (e.g., number of cells served by the satellite, number of user terminals served by the satellite, range of propagation delays associated with the user terminals served by the satellite, location of each of the user terminals served by the satellite, size of each cell served by the satellite, etc.). Thus, while the user terminal may be part of one group when receiving the downlink radio frame and transmitting the uplink burst, the user terminal can be part of a different group in a subsequent downlink and uplink communication if the satellite changes the number and/or memberships of groups thereafter.

In some cases, the method 800 can include determining, based on the one or more additional offset delays and a third time when the second downlink radio frame was received by the user terminal or transmitted by the satellite, a fourth time for transmitting a second uplink radio burst to the satellite. The second uplink radio burst transmitted at the fourth time can be estimated to arrive (based on the fourth time) at the satellite within a same additional radio frame interval as one or more uplink radio bursts from one or more additional user terminals in the different group of user terminals. The user terminal can then transmit, to the satellite, the second uplink radio burst at the fourth time.

Turning to FIG. 8B, at block 822, the method 820 can include determining one or more coverage characteristics of a radio beam from a satellite (e.g., SAT 102A). In some examples, the coverage characteristics can include a number of cells (e.g., 110A, 110N) and/or a number of user terminals served by the radio beam from the satellite.

In some examples, the one or more coverage characteristics of the radio beam from the satellite can include the number of cells served by the radio beam from the satellite, the number of user terminals served by the radio beam from the satellite, a range of propagation delays associated with the number of user terminals served by the radio beam from the satellite, a respective location of each of the number of user terminals served by the radio beam from the satellite, and/or a respective size of each cell from the number of cells served by the radio beam from the satellite.

At block 824, the method 820 can include determining, based on the one or more coverage characteristics, a grouping scheme (e.g., grouping scheme 400, the grouping scheme shown in FIG. 5A, etc.) defining a number of user terminal groups (e.g., 470A-F, 540A-C) used to divide the number of user terminals into groups. For example, the grouping scheme can group user terminals served by the satellite into three groups, four groups, five groups, six groups, or more groups, based on the one or more coverage characteristics.

At block 826, the method 820 can include determining, based on the grouping scheme, a timing scheme (e.g., fixed timing scheme shown in FIG. 4, variable timing scheme 500, etc.) defining one or more offset delays (e.g., DL/UL offset 450, 562, 564) for scheduling transmissions between the satellite and each user terminal in each user terminal group from the number of user terminal groups. The one or more offset delays can provide non-overlapping time intervals for receive, process, and transmit operations at each user terminal. Thus, the non-overlapping time intervals can ensure that receive, process, or transmit operations at a user terminal do not overlap in time.

In some cases, the timing scheme and/or the one or more offset delays can group and cycle downlink and uplink transmissions associated with the number of user terminal groups. In some examples, the timing scheme and/or the one or more offset delays can time a downlink transmission for one or more user terminal groups during a transmit time for uplink transmissions from one or more other user terminal groups. In other words, the timing scheme and/or the one or more offset delays can ensure that while a first set of user terminal groups receives a downlink radio frame from the satellite, a second set of user terminal groups transmits uplink bursts to the satellite.

In some cases, the timing scheme can include a first satellite timing for downlink satellite transmissions to the number of user terminal groups and a second satellite timing for receiving uplink transmissions from the number of user terminal groups. The first satellite timing and the second satellite timing can be fixed relative to each other when, for example, the number of groups is above a first threshold (e.g., above n number of groups), a range of propagation delays associated with the number of user terminal groups is above a second threshold (e.g., above a certain spread of propagation delays), and/or a highest propagation delay associated with the number of user terminals is above a third threshold.

In some cases, the first satellite timing can be a variable timing that varies relative to the second satellite timing (e.g., is a variable Tx timing) when the number of groups is below the first threshold, the range of propagation delays associated with the number of user terminal groups (and/or a cell associated with the user terminal groups) is below the second threshold, and/or a propagation delay from the satellite to a location of a cell (or multiple cells) associated with the user terminal groups changes. For example, the first satellite timing can be a different satellite Tx timing than a previous satellite Tx timing calculated for a previous propagation delay from the satellite to the location of the cell (or multiple cells). In this example, the first satellite timing can be recalculated when the previous propagation delay changes. Here, the first satellite timing can be based on a new propagation delay from the satellite to the location of the cell (or multiple cells).

To illustrate, in some cases, the first satellite timing can be a satellite Tx timing recalculated for one or more user terminal groups based on a change in a propagation delay between the satellite and a point/location of a cell associated with the one or more user terminal groups. For example, at an earlier time, the satellite can implement a specific satellite Tx timing for communications with the one or more user terminal groups. The specific satellite Tx timing can be determined or selected at least partly based on a specific propagation delay at that earlier time, determined for the satellite and the point/location of the cell. At a later time when the propagation delay between the satellite and the point/location of the cell changes, the satellite can vary the satellite Tx timing, and instead implement a different Tx timing (e.g., by changing the first satellite timing) for communications with the one or more user terminal groups. Here, the different Tx timing can be determined or selected at least partly based on the different propagation delay at that later time.

In some cases, when the satellite serves multiple cells, the first satellite timing can be a variable timing relative to the second satellite timing when the number of groups (which can include user terminal groups across the multiple cells) is below the first threshold, the range of propagation delays associated with the number of user terminal groups is below the second threshold, and/or a propagation delay from the satellite to a location within the multiple cells (e.g., a point/location within a supercell representing or corresponding to the multiple cells) associated with the user terminal groups changes.

In some examples, the timing scheme can include a first satellite timing for downlink satellite transmissions to the number of user terminal groups and a second satellite timing for receiving uplink transmissions from the number of user terminal groups, wherein the first satellite timing is calculated at least partly based on a current propagation delay from the satellite to a location in a plurality of cells associated with the number of user terminal groups.

In some aspects, the method 820 can include determining that the current propagation delay from the satellite to the location in the plurality of cells has changed since an earlier time associated with the current propagation delay; determining a new propagation delay from the satellite to the location in the plurality of cells, wherein the new propagation delay corresponds to a different time after the earlier time; determining, based on the new propagation delay, a third satellite timing for downlink satellite transmissions to the number of user terminal groups and one or more different offset delays for scheduling transmissions between the satellite and each user terminal in each user terminal group from the number of user terminal groups, the one or more different offset delays providing non-overlapping time and frequency intervals for transmit operations at each user terminal; and transmitting, based on the third satellite timing, a second downlink radio frame to an associated user terminal group from the number of user terminal groups, the second downlink radio frame identifying the one or more different offset delays.

In some examples, the first satellite timing can be associated with different offset delays (e.g., DL/UL offsets 562 and 564). The different offset delays can be based on different propagation delays associated with different user terminals. Moreover, in some examples, the second satellite timing can be associated with an offset delay calculated based on a highest propagation delay (e.g., 440) associated with the number of user terminals.

At block 828, the method 820 can include transmitting, based on the timing scheme, a downlink radio frame (e.g., 412A, 512A) to a user terminal group from the number of user terminal groups. The downlink radio frame can include an indication of the one or more offset delays associated with the timing scheme.

In some aspects, the downlink radio frame can be transmitted to the user terminal group during a first time interval corresponding to downlink transmissions to the user terminal group. In some examples, the method 820 can include receiving, from a set of user terminals in a different user terminal group of the number of user terminal groups, uplink radio bursts transmitted by the set of user terminals during at least a portion of the first time interval. The uplink radio bursts from the set of user terminals can be received at a same target time associated with an uplink radio frame, and the same target time being based on the one or more offset delays and a respective time that each of the set of user terminals received a different downlink radio frame transmitted to the different user terminal group or the time that the satellite transmitted the different downlink radio frame to the different user terminal group.

In some aspects, the method 820 can include calculating, based on a detected change in the one or more coverage characteristics, a different grouping scheme defining a different number of user terminal groups; determining, based on the different grouping scheme, a different timing scheme defining one or more different offset delays for scheduling transmissions between the satellite and each user terminal in each user terminal group from the different number of user terminal groups, the one or more different offset delays providing non-overlapping time and frequency intervals for transmit operations at each user terminal; and transmitting, based on the different timing scheme, a second downlink radio frame to an associated user terminal group from the different number of user terminal groups, the second downlink radio frame identifying the one or more different offset delays.

In some examples, the timing scheme can include a first satellite timing for downlink satellite transmissions to the number of user terminal groups and a second satellite timing for receiving uplink transmissions from the number of user terminal groups, and the first satellite timing can be calculated at least partly based on a current propagation delay from the satellite to a location in a cell (or multiple cells) associated with the number of user terminal groups.

In some aspects, the method 820 can further include determining that the current propagation delay from the satellite to the location in the cell (or multiple cells) has changed since an earlier time associated with the current propagation delay; determining a new propagation delay from the satellite to the location in the cell (or multiple cells), wherein the new propagation delay corresponds to a different time after the earlier time; determining, based on the new propagation delay, a third satellite timing for downlink satellite transmissions to the number of user terminal groups and one or more different offset delays for scheduling transmissions between the satellite and each user terminal in each user terminal group from the number of user terminal groups, the one or more different offset delays providing non-overlapping time and frequency intervals for transmit operations at each user terminal; and transmitting, based on the third satellite timing, a second downlink radio frame to an associated user terminal group from the number of user terminal groups, the second downlink radio frame identifying the one or more different offset delays.

In some examples, the methods 800 and 820 may be performed by one or more computing devices or apparatuses. In one illustrative example, the methods 800 and 820 can be performed by a user terminal or SAT shown in FIG. 1A and/or one or more computing devices with the computing device architecture 900 shown in FIG. 9. In some cases, such a computing device or apparatus may include a processor, microprocessor, microcomputer, or other component of a device that is configured to carry out the steps of the methods 800 and 820. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods 800 and 820 are illustrated as a logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods 800 and 820 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement various techniques described herein. For example, the computing device architecture 900 can be used to implement at least some portions of the SATs 102, the SAGs 104, the user terminals 112 and/or the user network devices 114 shown in FIGS. 1A and 1B, and perform at least some Tx and Rx timing operations as described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include software, code, firmware, etc., for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
   determining, at a satellite in communication with a plurality of half-duplex user terminals, a maximum round-trip propagation delay associated with one or more user terminals of the plurality of half-duplex user terminals, wherein each user terminal of the plurality of half-duplex user terminals is associated with a propagation delay less than or equal to the maximum round-trip propagation delay;
   determining, based on the maximum round-trip propagation delay and one or more additional delays, a downlink to uplink (DL/UL) offset for the plurality of half-duplex user terminals, wherein the DL/UL offset comprises a time difference between a first downlink frame at the satellite and a first corresponding uplink frame at the satellite;
   transmitting, from the satellite, a first downlink frame to the plurality of half-duplex user terminals, wherein the first downlink frame comprises the DL/UL offset;
   receiving, at the satellite, a first uplink frame from a user terminal of the plurality of half-duplex user terminals associated with the maximum round-trip propagation delay during the first corresponding uplink frame at the satellite;

transmitting, from the satellite, a second downlink frame to the plurality of half-duplex user terminals; and receiving, at the satellite, a second uplink frame from an additional user terminal during a second corresponding uplink frame at the satellite corresponding to the second downlink frame, wherein the second corresponding uplink frame occurs after the first corresponding uplink frame.

2. The method of claim 1, wherein the plurality of half-duplex user terminals is grouped in a plurality of half-duplex user terminal groups.

3. The method of claim 2, wherein a duration of the DL/UL offset is greater than a duration of N number of downlink frames at the satellite, where N is an integer, and wherein a number of groups included in the plurality of half-duplex user terminal groups is less than N.

4. The method of claim 2, wherein the user terminal of the plurality of half-duplex user terminals associated with the maximum round-trip propagation delay is included in a first group of the plurality of half-duplex user terminal groups associated with the first downlink frame and the additional user terminal is included in a second group of the plurality of half-duplex user terminal groups associated with the second downlink frame.

5. The method of claim 1, further comprising:

determining, at a different location of the satellite, a second DL/UL offset for a first group of the plurality of half-duplex user terminals, wherein the first group of the plurality of half-duplex user terminals comprises the user terminal of the plurality of half-duplex user terminals associated with the maximum round-trip propagation delay, and wherein the second DL/UL offset is less than the DL/UL offset; and determining a transmit offset delay for transmitting a third downlink frame to the first group of the plurality of half-duplex user terminals, wherein the transmit offset delay comprises a different between the second DL/UL offset and the DL/UL offset.

6. The method of claim 1, wherein the one or more additional delays comprises at least one or more of a user terminal processing delay, a user terminal transmit (Tx) mode to receive (Rx) mode transition delay, or a user terminal Rx mode to Tx mode transition delay.

7. The method of claim 1, wherein the second downlink frame comprises the DL/UL offset.

8. The method of claim 1, wherein a beginning time of the first uplink frame is misaligned in time with a beginning time of a concurrent downlink frame at the satellite.

9. At least one non-transitory computer-readable storage medium comprising instructions stored thereon which, when executed by one or more processors, cause the one or more processors to:

determine, at a satellite in communication with a plurality of half-duplex user terminals, a maximum round-trip propagation delay associated with one or more user terminals of the plurality of half-duplex user terminals, wherein each user terminal of the plurality of half-duplex user terminals is associated with a propagation delay less than or equal to the maximum round-trip propagation delay;

determine, based on the maximum round-trip propagation delay and one or more additional delays, a DL/UL offset for the plurality of half-duplex user terminals, wherein the DL/UL offset comprises a time difference between a first downlink frame at the satellite and a first corresponding uplink frame at the satellite;

transmit, from the satellite, a first downlink frame to the plurality of half-duplex user terminals, wherein the first downlink frame comprises the DL/UL offset;

receive, at the satellite, a first uplink frame from a user terminal of the plurality of half-duplex user terminals associated with the maximum round-trip propagation delay during the first corresponding uplink frame at the satellite;

transmit, from the satellite, a second downlink frame to the plurality of half-duplex user terminals; and receive, at the satellite, a second uplink frame from an additional user terminal during a second corresponding uplink frame at the satellite corresponding to the second downlink frame, wherein the second corresponding uplink frame occurs after the first corresponding uplink frame.

10. The at least one non-transitory computer-readable storage medium of claim 9, wherein the plurality of half-duplex user terminals is grouped in a plurality of half-duplex user terminal groups.

11. The at least one non-transitory computer-readable storage medium of claim 10, wherein the user terminal of the plurality of half-duplex user terminals associated with the maximum round-trip propagation delay is included in a first group of the plurality of half-duplex user terminal groups associated with the first downlink frame and the additional user terminal is included in a second group of the plurality of half-duplex user terminal groups associated with the second downlink frame.

12. The at least one non-transitory computer-readable storage medium of claim 9, further comprising instructions stored thereon which, when executed by one or more processors, cause the one or more processors to:

determine, at a different location of the satellite, a second DL/UL offset for a first group of the plurality of half-duplex user terminals, wherein the first group of the plurality of half-duplex user terminals comprises a user terminal of the plurality of half-duplex user terminals associated with the maximum round-trip propagation delay, and wherein the second DL/UL offset is less than the DL/UL offset; and determine a transmit offset delay for transmitting a third downlink frame to the first group of the plurality of half-duplex user terminals, wherein the transmit offset delay comprises a different between the second DL/UL offset and the DL/UL offset.

13. The at least one non-transitory computer-readable storage medium of claim 9, wherein the one or more additional delays comprises at least one or more of a user terminal processing delay, a user terminal Tx mode to Rx mode transition delay, or a user terminal Rx mode to Tx mode transition delay.

14. The at least one non-transitory computer-readable storage medium of claim 9, wherein a beginning time of the first uplink frame is misaligned in time with a beginning time of a concurrent downlink frame at the satellite.

15. A system comprising:

one or more processors; and at least one non-transitory computer-readable medium having stored thereon instructions that, when executed by the one or more processors, cause the one or more processors to:

determine, at a satellite in communication with a plurality of half-duplex user terminals, a maximum round-trip propagation delay associated with one or more user terminals of the plurality of half-duplex user terminals, wherein each user terminal of the plurality of half-duplex user terminals is associated with a propagation delay less than or equal to the maximum round-trip propagation delay;

determine, based on the maximum round-trip propagation delay and one or more additional delays, a DL/UL offset for the plurality of half-duplex user terminals, wherein the DL/UL offset comprises a time difference between a first downlink frame at the satellite and a first corresponding uplink frame at the satellite;

transmit, from the satellite, a first downlink frame to the plurality of half-duplex user terminals, wherein the first downlink frame comprises the DL/UL offset;

receive, at the satellite, a first uplink frame from a user terminal of the plurality of half-duplex user terminals associated with the maximum round-trip propagation delay during the first corresponding uplink frame at the satellite;

transmit, from the satellite, a second downlink frame to the plurality of half-duplex user terminals; and receive, at the satellite, a second uplink frame from an additional user terminal during a second corresponding uplink frame at the satellite corresponding to the second downlink frame, wherein the second corresponding uplink frame occurs after the first corresponding uplink frame.

16. The system of claim 15, wherein the plurality of half-duplex user terminals is grouped in a plurality of half-duplex user terminal groups.

17. The system of claim 16, wherein the user terminal of the plurality of half-duplex user terminals associated with the maximum round-trip propagation delay is included in a first group of the plurality of half-duplex user terminal groups associated with the first downlink frame and the additional user terminal is included in a second group of the plurality of half-duplex user terminal groups associated with the second downlink frame.

18. The system of claim 15, the at least one non-transitory computer-readable medium having stored thereon instructions that, when executed by the one or more processors, cause the one or more processors to:

determine, at a different location of the satellite, a second DL/UL offset for a first group of the plurality of half-duplex user terminals, wherein the first group of the plurality of half-duplex user terminals comprises the user terminal of the plurality of half-duplex user terminals associated with the maximum round-trip propagation delay, and wherein the second DL/UL offset is less than the DL/UL offset; and determine a transmit offset delay for transmitting a third downlink frame to the first group of the plurality of half-duplex user terminals, wherein the transmit offset delay comprises a different between the second DL/UL offset and the DL/UL offset.

19. The system of claim 15, wherein the one or more additional delays comprises at least one or more of a user terminal processing delay, a user terminal Tx mode to Rx mode transition delay, or a user terminal Rx mode to Tx mode transition delay.

20. The system of claim 15, wherein a beginning time of the first uplink frame is misaligned in time with a beginning time of a concurrent downlink frame at the satellite.

* * * * *

UNITED STATES PATENT AND TRADEMARK OFFICE
CERTIFICATE OF CORRECTION

| | | |
|---|---|---|
| PATENT NO. | : 11,924,821 B1 | Page 1 of 1 |
| APPLICATION NO. | : 17/339860 | |
| DATED | : March 5, 2024 | |
| INVENTOR(S) | : Peter J. Worters, Martin S. McCormick and Andrew G. Whitlow | |

It is certified that error appears in the above-identified patent and that said Letters Patent is hereby corrected as shown below:

In the Claims

- Claim 5 (Column 43, Line 40): "different" should be changed to --difference--.

- Claim 12 (Column 44, Line 47): "different" should be changed to --difference--.

- Claim 18 (Column 46, Line 22): "different" should be changed to --difference--.

Signed and Sealed this
Fourteenth Day of May, 2024

Katherine Kelly Vidal
*Director of the United States Patent and Trademark Office*